(12) United States Patent
Tanaka

(10) Patent No.: US 11,765,491 B2
(45) Date of Patent: Sep. 19, 2023

(54) DISPLAY DEVICE AND SPEAKER UNIT

(71) Applicant: Funai Electric Co., Ltd., Osaka (JP)

(72) Inventor: Kazuya Tanaka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/582,436

(22) Filed: Jan. 24, 2022

(65) Prior Publication Data

US 2022/0248115 A1 Aug. 4, 2022

(30) Foreign Application Priority Data

Feb. 3, 2021 (JP) .................................... 2021-16080

(51) Int. Cl.
H04R 1/02 (2006.01)
(52) U.S. Cl.
CPC ......... H04R 1/026 (2013.01); H04R 2499/15 (2013.01)
(58) Field of Classification Search
CPC .............................. H04R 1/026; H04R 2499/15
See application file for complete search history.

(56) References Cited

U.S. PATENT DOCUMENTS

2006/0280327 A1 12/2006 Nakagawa
2022/0174396 A1* 6/2022 Kim .......................... H04R 1/02

FOREIGN PATENT DOCUMENTS

JP 2006-345292 A 12/2006

* cited by examiner

*Primary Examiner* — Andrew L Sniezek
(74) *Attorney, Agent, or Firm* — Global IP Counselors, LLP

(57) ABSTRACT

A display device comprises a display, a rear side member, and a plurality of speaker units. The speaker units each have a speaker main body having first and second surfaces that are attachable to the rear side member and are parallel to each other and a side surface that connects the first surface and the second surface, and at least one sound emitting portion displaced from a center of the side surface on the side surface. When the speaker main body is inverted from a first state in which the first surface is fixed to the rear side member to a second state in which the second surface is fixed to the rear side member, the at least one sound emitting portion in the first state and the at least one sound emitting portion in the second state are arranged to be symmetrical with respect to an axis of inversion.

19 Claims, 19 Drawing Sheets

(SECOND EMBODIMENT)

(THIRD EMBODIMENT)

(FOURTH EMBODIMENT)

(FIFTH EMBODIMENT)

(SIXTH EMBODIMENT)

(MODIFICATION EXAMPLE)

DISPLAY DEVICE AND SPEAKER UNIT

CROSS-REFERENCE TO RELATED APPLICATIONS

This application claims priority to Japanese Patent Application No. 2021-16080 filed on Feb. 3, 2021. The entire disclosure of Japanese Patent Application No. 2021-16080 is hereby incorporated herein by reference.

BACKGROUND

Field of the Invention

The present invention relates to a display device and a speaker unit, and in particular relates to a display device having a display, a rear side member, and a plurality of speaker units, and to a speaker unit.

Background Information

Conventionally, a speaker attached to a video display device is known (see, for example, Japanese Patent Application Publication No. 2006-345292 (Patent Literature 1)).

Patent Literature 1 above discloses a speaker device having a speaker and a unit substrate on one surface of which the speaker is attached. In this speaker device, the speaker is attached to one surface of the unit substrate and a frame forming part of the video display device is attached to the other surface. In the speaker device, a bass speaker, a treble speaker, and a bass speaker are arranged in this order in the left-right direction of the unit substrate. The left and right bass speakers are configured in point symmetry around a central axis of the center treble speaker. The speaker device for the left side is attached on the left side of the frame forming part of the video display device, and the speaker device for the right side is attached on the right side of the frame forming part. The speaker device for the left side and the speaker device for the right side are the same.

In a display device such as a television receiver, the speaker device is usually arranged on one side and the other side in the left-right direction of the display device, and is often made into separate parts as a speaker device for the left side and a speaker device for the right side.

SUMMARY

Patent Literature 1 above discloses a speaker device with a configuration in which a front opening (sound emitting portion) of the speaker is provided on an attaching surface to the frame forming part in the speaker device. However, the speaker device of Patent Literature 1 above has a problem that it cannot emit sound from a surface other than the attaching surface of the speaker device to the frame forming part. Therefore, in a speaker device (speaker unit) with a configuration in which the sound emitting portion of the speaker is arranged on a surface other than the attaching surface to the frame forming part (a rear side member provided on the rear side of the display) such that the sound can be emitted from the speaker from a surface other than the attaching surface to the frame forming part, it is desired to be able to share parts between the left side speaker unit and the right side speaker unit, thereby reducing the number of parts.

One object is to provide a display device and a speaker unit in which parts can be shared between the left side speaker unit and the right side speaker unit for a speaker unit having a configuration in which the sound emitting portion of the speaker is arranged on a surface other than the attaching surface to the rear side member.

In view of the state of the known technology and according to a first aspect of the present invention, a display device comprises a display, a rear side member provided on a rear side of the display, and a plurality of speaker units attached to the rear side member and including a first speaker unit disposed on one side in a left-right direction on the rear side of the display and a second speaker unit disposed on the other side, the speaker units each having a speaker main body having first and second surfaces that are attachable to the rear side member and are parallel to each other and a side surface that connects the first surface and the second surface, a first fixing portion for attaching and fixing the first surface to the rear side member, a second fixing portion for attaching and fixing the second surface to the rear side member, and at least one sound emitting portion displaced from a center of the side surface on the side surface, when the speaker main body is inverted from a first state in which the first surface is fixed to the rear side member to a second state in which the second surface is fixed to the rear side member, the at least one sound emitting portion in the first state and the at least one sound emitting portion in the second state being arranged to be symmetrical with respect to an axis of inversion.

In view of the state of the known technology and according to a second aspect of the present invention, a speaker unit comprises a speaker main body having first and second surfaces that are attachable to a device and are parallelly opposite to each other and a side surface that connects the first surface and the second surface, a first fixing portion for attaching and fixing the first surface to the device, a second fixing portion for attaching and fixing the second surface to the device, and at least one sound emitting portion displaced from a center of the side surface on the side surface, when the speaker main body is inverted from a first state in which the first surface is fixed to the device to a second state in which the second surface is fixed to the device, the at least one sound emitting portion in the first state and the at least one sound emitting portion being arranged to be symmetrical with respect to an axis of inversion.

BRIEF DESCRIPTION OF THE DRAWINGS

Referring now to the attached drawings which form a part of this original disclosure.

DETAILED DESCRIPTION OF EMBODIMENTS

Figure 1:
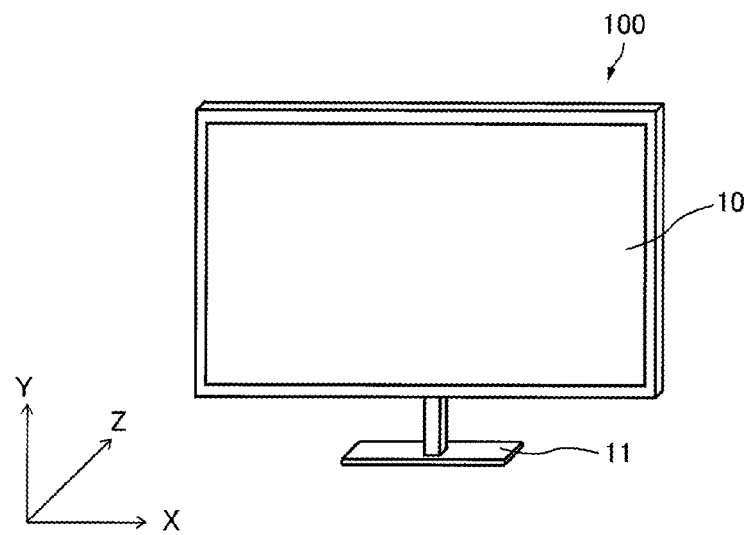
FIG. 1 is a perspective view of a display device according to a first embodiment, as viewed from a front side.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of Display Device Including Speaker Unit)

Referring to FIGS. 1 to 6, the configuration of a display device 100 including speaker units 200 according to a first embodiment of the present invention will be described. In the drawings, the left-right direction when the display device 100 including the speaker units 200 is viewed from the front side is referred to as an X direction. The vertical direction when the display device 100 is viewed from the front side is also referred to as a Y direction. The direction connecting the rear side and the front side of the display device 100 is referred as a Z direction.

Figure 2:
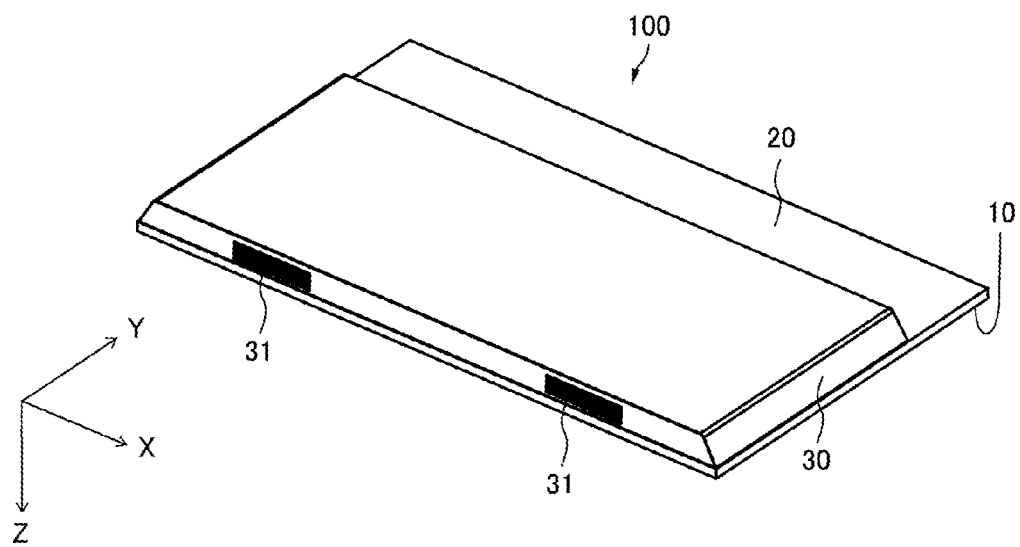
FIG. 2 is a perspective view of the display device according to the first embodiment, as viewed from a rear side.
Figure 3:
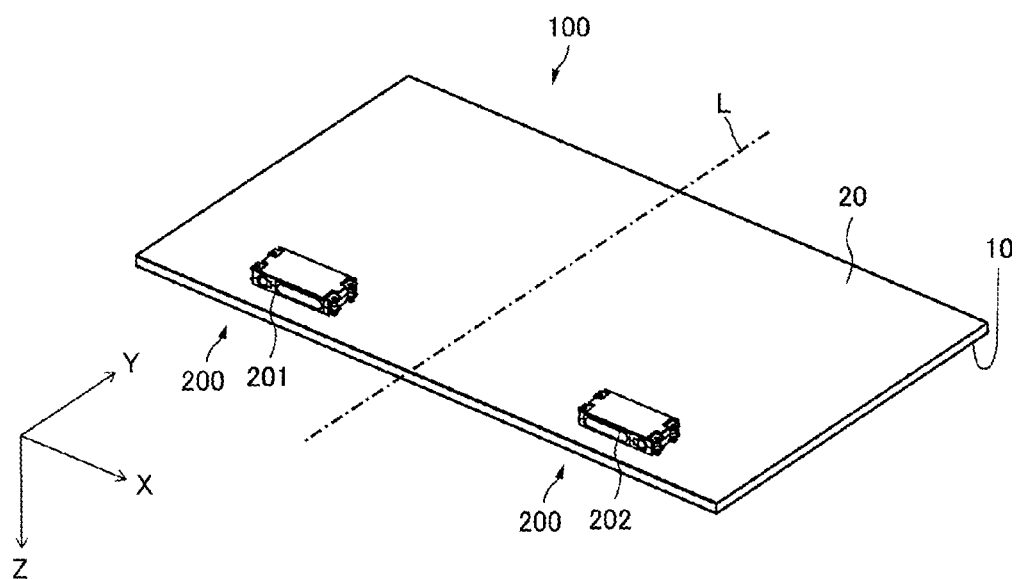
FIG. 3 is a perspective view of the display device according to the first embodiment with a rear cover removed, as viewed from the rear side.

As shown in FIGS. 1 to 3, the display device 100 including the speaker units 200 (see FIG. 3) according to the first embodiment comprises a display 10, a rear frame 20, a plurality of speaker units 200, and a rear cover 30. The display device 100 is supported by a stand 11 (see FIG. 1). The speaker units 200 are attached and fixed to the rear frame 20. FIG. 1 is a perspective view of the display device 100, as viewed from the front side, FIG. 2 is a perspective view of the display device 100, as viewed from the rear side, and FIG. 3 is a perspective view the display device 100 with the rear cover 30 removed, as viewed from the rear side. In FIGS. 2 and 3, illustration of the stand 11 is omitted. The rear frame 20 is an example of a "rear side member" in the claims.

The display 10 is disposed on the front-most side of the display device 100. The display 10 is, for example, a liquid crystal panel.

The rear frame 20 is disposed so as to cover the rear side of the display 10 and supports the display 10. The rear frame 20 is made, for example, of a metal plate. The fixing structure of the rear frame 20 and the speaker units 200 will be described later.

As shown in FIG. 3, the plurality of the speaker units 200 are attached on a surface of the rear frame 20 on the opposite side to the display 10. The speaker units 200 include a first speaker unit 201 and a second speaker unit 202. The first speaker unit 201 and the second speaker unit 202 are the same or identical to each other. The first speaker unit 201 is disposed on the left side when viewed from the rear side of the display device 100, which is one side of the rear frame 20 in the left-right direction. The second speaker unit 202 is disposed on the right side when viewed from the rear side of the display device 100, which is the other side of the rear frame 20 in the left-right direction. The first speaker unit 201, which is disposed on the right side when viewed from the front side of the display device 100, is configured as a right side speaker unit, and the second speaker unit 202, which is disposed on the left side when viewed from the front side of the display device 100, is configured as a left side speaker unit. The first speaker unit 201 and the second speaker unit 202 are arranged so that they are symmetrical with respect to a center line L that divides the one side and the other side of the rear frame 20 in the left-right direction. In this embodiment, one first speaker unit 201 is disposed on a lower left side of the rear frame 20 when viewed from the rear side of the display device 100, and one second speaker unit 202 is disposed on a lower right side of the rear frame 20 when viewed from the rear side of the display device 100. The number of the first speaker unit 201 and the second speaker unit 202 attached to the rear frame 20 is not particularly limited. The details of the speaker units 200 will be described later.

As shown in FIG. 2, the rear cover 30 is arranged to cover a part of the rear frame 20 and the speaker units 200. The rear cover 30 is disposed on a surface of the rear frame 20 on the opposite side to the display 10. The rear cover 30 is provided with through holes 31 partitioned by lattices formed for outputting the sound output from the speaker units 200 to the outside and for protecting the speaker units 200 from foreign objects on a surface opposite to sound emitting portions 240 (see FIG. 4) that face downward of the speaker units 200. The rear cover 30 is attached and fixed to the rear frame 20 by a fixing member not shown in the drawings.

(Configuration of Speaker Unit)

Figure 4:
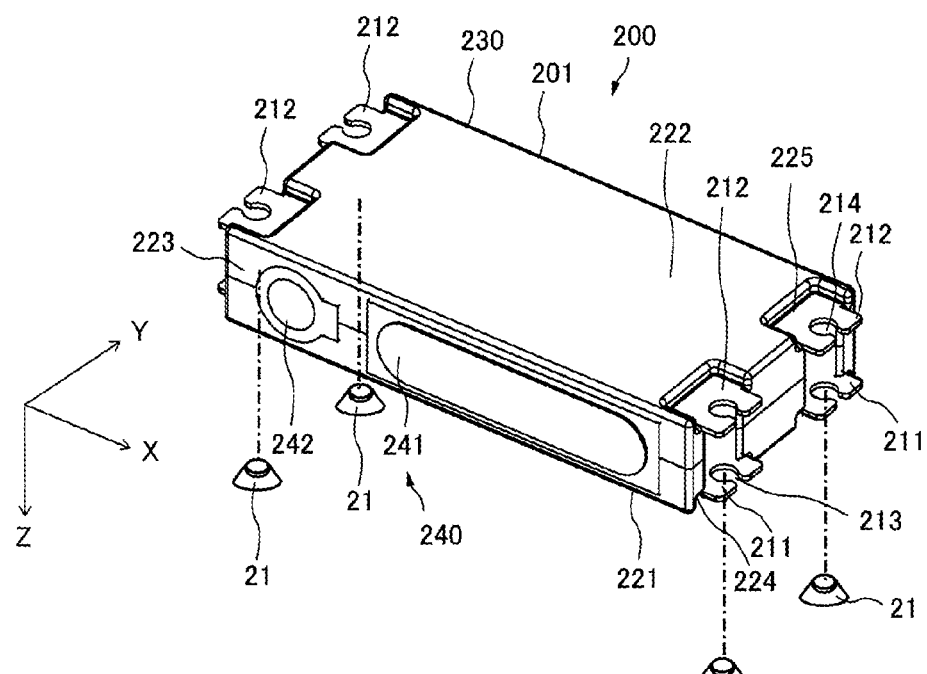
FIG. 4 is a perspective view of a first speaker unit according to the first embodiment.

As shown in FIG. 4, the speaker units 200 each have a speaker main body 230, first fixing portions 211, second fixing portions 212, and the sound emitting portion 240. FIG. 4 is a perspective view of the first speaker unit 201. The second speaker unit 202 is identical to the first speaker unit 201 and the illustration in the drawings is omitted.

The speaker main body 230 has a first surface 221 and a second surface 222 that are mutually parallel to each other, and side surfaces 223 that connects the first surface 221 and the second surface 222. In this embodiment, the speaker main body 230 has a cuboid shape. The shape of the speaker main body 230 is not particularly limited. In addition, the first surface 221, the second surface 222 and four side surfaces 223 of the speaker main body 230 have a rectangular shape. The speaker main body 230 contains, for example, a bass speaker and a treble speaker. The number and type of speakers contained in the speaker main body 230 are not particularly limited. In this embodiment, the speaker main body 230 contains one bass speaker and one treble speaker. The speaker main body 230 is made, for example, of ABS resin or polyethylene resin. As seen in FIG. 4, the speaker main body 230 is symmetrical with respect to a center plane that is parallel to the first surface 221 and the second surface 222.

The first fixing portions 211 are configured to be able to attach and fix the first surface 221 of the speaker main body 230 to rear frame side fixing portions 21 (see FIG. 6) of the rear frame 20 described later. The number of the first fixing portions 211 can be one or more. In this embodiment, the first fixing portions 211 comprise a plurality of fixing portions. Two of the first fixing portions 211 are provided along each of mutually parallel sides of the first surface 221. The first fixing portions 211 are provided at the four corners of the first surface 221. The first fixing portions 211 are provided along the first surface 221 of the speaker main body 230 protruding outward from the speaker main body 230. The first fixing portions 211 are provided in portions 224 of the first surface 221 of the speaker main body 230 (see FIG. 6) that are depressed toward the second surface 222. The first fixing portions 211 have an approximately rectangular shape. One ends of the first fixing portions 211 are connected to the first surface 221 of the speaker unit 200, while the other ends of the first fixing portions 211 are provided with first notches 213 cut in an approximately circular shape toward the one ends of the first fixing portions 211. The first notches 213 are configured such that connection members 40 (see FIG. 6) for connecting and fixing with the rear frame side fixing portions 21 can be fitted. The first fixing portions 211 and the speaker main body 230 are integrally molded. The first fixing portions 211 may have a D-shape or a triangular shape, and are not particularly limited. The first notches 213 may be cut into a polygonal shape or a rounded corner shape, and are not particularly limited. In the illustrated embodiment, the first fixing portions 211 (e.g., the fixing portions of the first fixing portion) are arranged to be symmetrical with respect to a plane extending perpendicular to the first surface 221 and the second surface 221 of the speaker main body 230.

The second fixing portions 212 are configured to be able to attach and fix the second surface 222 of the speaker main body 230 to the rear frame side fixing portions 21 of the rear frame 20. The number of the second fixing portions 212 can be one or more. In this embodiment, the second fixing portions 212 comprise a plurality of fixing portions. Two of the second fixing portions 212 are provided along each of mutually parallel sides of the second surface 222. The second fixing portions 212 are provided at the four corners of the second surface 222. The second fixing portions 212 are provided along the second surface 222 of the speaker main body 230 protruding outward from the speaker main body 230. The second fixing portions 212 are provided in portions 225 of the second surface 222 of the speaker main body 230 that are depressed toward the first surface 221. The second fixing portions 212 have an approximately rectangular shape. One ends of the second fixing portions 212 are connected to the second surface 222 of the speaker unit 200, while the other ends of the second fixing portions 212 are provided with second notches 214 cut in an approximately circular shape toward the one ends of the second fixing portions 212. The second notches 214 are configured such that the connection members 40 for connecting and fixing with the rear frame side fixing portions 21 can be fitted. The second fixing portions 212 and the speaker main body 230 are integrally molded. The second fixing portions 212 may have a D-shape or a triangular shape, and are not particularly limited. The second notches 214 may be cut into a polygonal shape or a rounded corner shape, and are not particularly limited. In the illustrated embodiment, the second fixing portions 212 (e.g., the fixing portions of the second fixing portion) are arranged to be symmetrical with respect to a plane extending perpendicular to the first surface 221 and the second surface 221 of the speaker main body 230.

Figure 5:
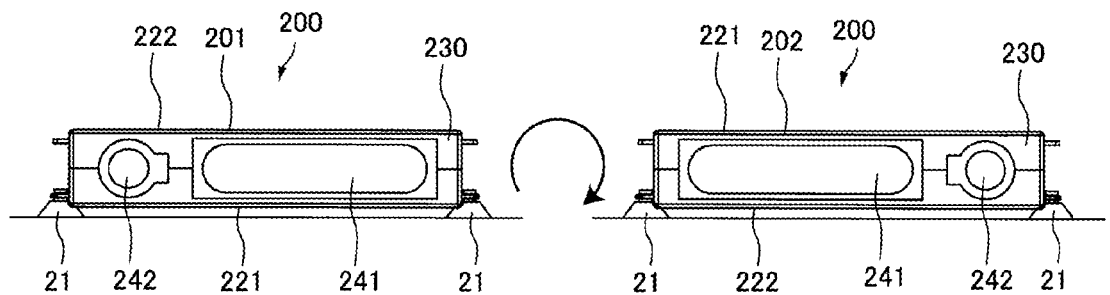
FIG. 5 is a schematic diagram of an arrangement of a sound emitting portion when the first (second) speaker unit is inverted.

As shown in FIG. 5, when the speaker main body 230 is inverted from the state (e.g., the first state) in which the first surface 221 is fixed to the rear frame 20 to the state (e.g., the second state) in which the second surface 222 is fixed to the rear frame 20, the relative positions of the fixing portions of the first fixing portions 211 are arranged to be the same as the relative positions of the fixing portions of the second fixing portions 212. In particular, the relative positions of the fixing portions of the first fixing portions 211 in the first state are arranged to be the same as the relative positions of the fixing portions of the second fixing portions 212 in the second state. Furthermore, the positions of the fixing portions of the first fixing portions 211 and the positions of the fixing portions of the second fixing portion 212 are arranged to be the same or are aligned when viewed from the first surface 221 side of the speaker main body 230. Furthermore, as also shown in FIGS. 4 and 5, in the illustrated embodiment, the first fixing portions 211 of the first speaker unit 201 are fixed to the rear frame 20 such that the first surface 221 of the first speaker unit 201 faces toward the rear frame 20. Furthermore, the second fixing portions 212 of the second speaker unit 202 are fixed to the rear frame 20 such that the second surface 222 of the second speaker unit 202 faces toward the rear frame 20.

The sound emitting portion 240 is provided on a side surface 223 of the speaker main body 230. The sound emitting portion 240 is the portion where the diaphragm of the speaker contained in the speaker main body 230 is disposed. The sound emitting portion 240 is provided in correspondence with the number and position of the speakers contained in the speaker main body 230. In this embodiment, a sound emitting portion 241 where the diaphragm of the bass speaker contained in the speaker main body 230 is disposed, and a sound emitting portion 242 where the diaphragm of the treble speaker contained in the speaker main body 230 is disposed are provided. These two sound emitting portions 241 and 242 are disposed asymmetrically with respect to the center of the side surface 223 in the side surface 223 of the speaker main body 230 (see FIG. 4). In addition, as shown in FIG. 5, these two sound emitting portions 241 and 242 are arranged such that the two sound emitting portions 241 and 242 are symmetrical with respect to the axis of inversion when the speaker main body 230 is inverted from the state (e.g., the first state) in which the first surface 221 of the speaker unit 200 is fixed to the rear frame 20 to the state (e.g., the second state) in which the second surface 222 of the speaker unit 200 is fixed to the rear frame 20. In particular, the two sound emitting portions 241 and 242 in the first state (left side in FIG. 5) and the two sound emitting portions 241 and 242 in the second state (right side in FIG. 5) are arranged to be symmetrical with respect to the axis of inversion or with respect to an imaginary plane extending perpendicular to the first surface 221 and the second surface 222.

(Fixing Structure Between Speaker Unit and Rear Frame)

Figure 6:
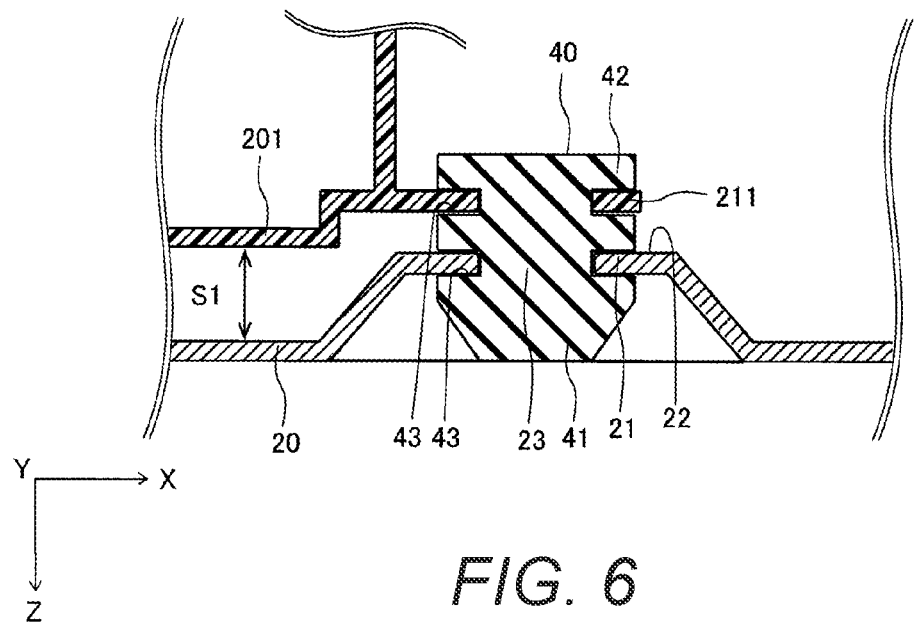
FIG. 6 is a schematic cross-sectional view of an example 1 of a fixing structure between the first speaker unit and a rear frame.

As shown in FIG. 6, with the speaker unit 200, the first fixing portions 211 or the second fixing portions 212 are fixed to the rear frame side fixing portions 21 via the connection members 40. The speaker unit 200 is fixed via a gap S1 between the first surface 21 or the second surface 222 that is fixed to the rear frame 20 and the rear frame. In this embodiment, the connection members 40 each include a lower part 41 having a dome shape and an upper part 42 having a column shape. The connection members 40 each have two annular recesses 43 in the upper part 42. The speaker unit 200 and the rear frame 20 are fixed by fitting the first notches 213 formed in the first fixing portions 211 or the second notches 214 formed in the second fixing portions 212 into the recesses 43 formed on the opposite side of the lower parts 41 of the connection members, and by fitting the lower parts 41 of the connection members 40 into holes 23 formed in the rear frame side fixing portions 21. FIG. 6 is a schematic cross-sectional view of an example 1 of the fixing structure between the first speaker unit 201 and the rear frame 20. An example 1 of the fixing structure between the second speaker unit 202 and the rear frame 20 is identical to the embodiment 1 of the fixing structure between the first speaker unit 201 and the rear frame 20, and thus the illustration is omitted. The connection members 40 may be a shape having a dome shape, a column shape and a dome shape, and are not limited to a particular shape as long as they can connect and fix the first fixing portion 212 or the second fixing portion 212 and the rear frame side fixing portions 21.

The rear frame side fixing portions 21 (see FIG. 6) are portions for attaching and fixing the first fixing portions 211 (see FIG. 4) or the second fixing portions 212 (see FIG. 4) of the speaker units 200. The rear frame side fixing portions 21 are provided at least one each on one side and the other side in the left-right direction of the surface of the rear frame 20 on the opposite side to the display 10. The rear frame side fixing portions 21 are arranged so as to be symmetrical with respect to the center line L. As shown in FIG. 6, the rear frame side fixing portions 21 each have a protruding surface 22 in which a part of the rear frame 20 protrudes to the opposite side to the display 10, and are formed to have a conical shape. On the protruding surfaces 22 of the rear frame side fixing portions 21, the holes 23 into which the connection members 40 for connecting and fixing the first fixing portions 211 or the second fixing portions 211 of the speaker units 200 can be fitted. The rear frame side fixing portions 21 are examples of the "third fixing portion" in the claims.

The connection members 40 are formed, for example, of an elastic body. The connection members 40 are formed, for example, of silicone, butyl rubber, or thermoplastic elastomer. By using the connection members 40 formed of the above materials, the vibration of the speaker units 200 can be suppressed from being transmitted to the rear frame 20, the number of parts can be reduced because there is no need to separately use other members that suppress or absorb the vibration of the speaker units 200, and the workability can be improved because it is not necessary to use tools to fix the speaker units 200 to the rear frame 20.

(Effect of First Embodiment)

In the first embodiment, the following effects can be obtained.

In the first embodiment, as described above, the speaker unit 200 include the first fixing portions 211, the second fixing portions 212, and the sound emitting portion 240 disposed on the side surface 223, and the sound emitting portion 240 in the first state and the sound emitting portion 240 in the second state are arranged to be symmetrical with respect to the axis of inversion when the speaker main body 230 is inverted from the first state in which the first surface 221 is fixed to the rear frame 20 to the second state in which the second surface 222 is fixed to the rear frame 20. With this configuration, for the same speaker unit 200, the speaker unit 200 disposed on the left side of the rear side of the display 10 with the first surface 221 fixed to the rear frame 20 can be used as the first speaker unit 201 (e.g., the right side speaker unit), and the speaker unit 200 disposed on the right side of the rear side of the display 10 with the second surface 222 fixed to the rear frame 20 can be used as the second speaker unit 202 (e.g., the left side speaker unit). Therefore, for the speaker unit 200 with a configuration in which the sound emitting portion 240 of the speaker is arranged on a surface other than an attaching surface to the rear frame 20, parts can be shared between the left side speaker unit and the right side speaker unit. As a result, the number of parts can be reduced. Also, the sound emitting portion 240 includes the sound emitting portions 241 and 242 that are disposed asymmetrically with respect to the center of the side surface 223 on the side surface 223.

In addition, in the first embodiment, as described above, the first fixing portions 211 and the second fixing portions 212 comprises the plurality of fixing portions, and the relative positions of the fixing portions of the first fixing portions 211 in the first state are arranged to be the same as the relative positions of the fixing portions of the second fixing portion 212 in the second state when the speaker main body 230 is inverted from the first state in which the first surface 221 is fixed to the rear frame 20 to the second state in which the second surface 222 is fixed to the rear frame 20. With this configuration, the first fixing portions 211 and the second fixing portions 212 can be easily and securely attached and fixed to the rear frame side fixing portions 21.

In addition, in the first embodiment, as described above, the position of each of the fixing portions of the first fixing portions 211 and the positions of the fixing portions of the second fixing portions 212 are aligned when viewed from the first surface 221 side of the speaker main body 230. With this configuration, the same speaker unit 200 can be symmetrically disposed on the rear side of the display 10 as the first speaker unit 201 (e.g., the right side speaker unit) with the first surface 221 fixed to the rear frame 20 and the second speaker unit 202 (e.g., the left side speaker unit) with the second surface 222 fixed to the rear frame 20.

In addition, in the first embodiment, as described above, the first surface 221 and the second surface 222 have a rectangular shape, two of the fixing portions of the first fixing portions 211 are provided along each of the mutually parallel sides of the first surface 221, and two of the fixing portions of the second fixing portions 212 are provided along each of the mutually parallel sides of the second surface 222. With this configuration, the first fixing portions 211 and the second fixing portions 212 can be more securely attached and fixed to the rear frame side fixing portions 21.

Also, in the first embodiment, as described above, the first fixing portions 211 are provided protruding from the speaker main body 230 along the first surface 221, and the second fixing portions 212 are provided protruding from the speaker main body 230 along the second surface 222. With this configuration, the first fixing portions 211 and the second fixing portions 212 can be seen when the speaker unit 200 is attached and fixed to the rear frame 20. Therefore, the first fixing portions 211 and the second fixing portions 212 can be more easily attached and fixed to the rear frame side fixing portions 21.

Also, in the first embodiment, as described above, the rear frame 20 includes the rear frame side fixing portion 21 for fixing the first fixing portions 211 and the second fixing portions 212 and provided on the one side and the other side in the left-right direction protruding away from the display 10, the first fixing portions 211 are provided in the portions 224 of the first surface 221 that are depressed toward the second surface 222, the second fixing portions 212 are provided in the portions 225 of the second surface 222 that are depressed toward the first surface 221, the first speaker unit 201 is fixed via the gap S1 between the first surface 221 and the rear frame 20 while the first fixing portions 211 are fixed to the rear frame side fixing portions 21 via the connection members 40, and the second speaker unit 212 is fixed via the gap S1 between the second surface 222 and the rear frame 20 while the second fixing portions 212 are fixed to the rear frame side fixing portions 21 via the connection members 40. With this configuration, by fixing the speaker unit 200 to the rear frame 20 via the gap S1, it is possible to suppress the transmission of vibration of the speaker unit 200 to the rear frame 20. In addition, by providing the first fixing portions 211 and the second fixing portions 212 protruding from the depressed portions 224 and 225 or the side surface 223, the distance from the rear frame 20 to the first surface 221 or the second surface 222 of the speaker unit 200 that is not fixed to the rear frame 20 can be reduced. As a result, the transmission of vibration by the speaker unit 200 can be suppressed and the increase of the thickness of the rear side of the display device 100 can be suppressed. As a result, vibration transmission by the speaker unit 200 can be suppressed and the thickness of the rear side of the display device 100 can be suppressed.

In addition, in the first embodiment, as described above, the first fixing portions 211 are directly attached and fixed to the rear frame 20 in the first speaker unit 201, and the first fixing portions 212 are directly attached and fixed to the rear frame 20 in the second speaker unit 202. With this configuration, the speaker unit 200 can be easily and simply attached and fixed to the rear frame 20.

Second Embodiment

Figure 7:
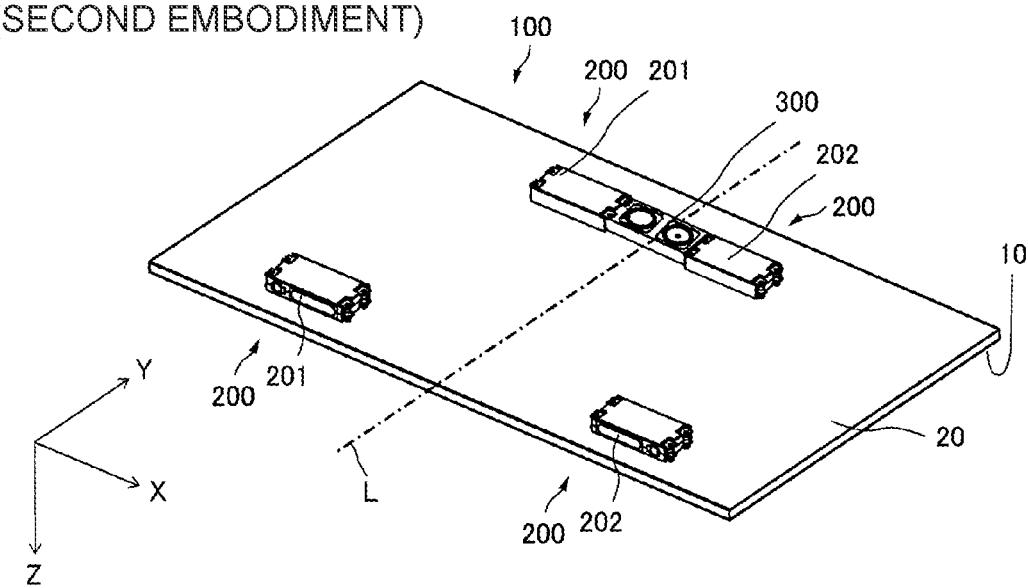
FIG. 7 is a perspective view of a display device according to a second embodiment with a rear cover removed, as viewed from a rear side.

Next, referring to FIGS. 7 to 9, the configuration of the display device 100 including the speaker units 200 according to a second embodiment will be described. In the second embodiment, unlike the first embodiment in which one first speaker unit 201 is disposed on the lower left side of the rear frame 20 when viewed from the rear side of the display device 10 and one second speaker unit 202 is disposed on the lower right side of the rear frame when viewed from the rear side of the display device 10, another first speaker unit 201 is further disposed on an upper left side of the rear frame 20 when viewed from the rear side of the display device 100, another second speaker unit 202 is further disposed on an upper right side of the rear frame 20 when viewed from the rear side of the display device 100, and a third speaker unit 300 is further provided that is disposed between the first speaker unit 201 disposed on the upper left side and the second speaker unit 202 disposed on the upper right side and is fixed by the second fixing portions 212 of the first speaker unit 201 and the first fixing portion 211 of the second speaker unit 202.

Figure 8:
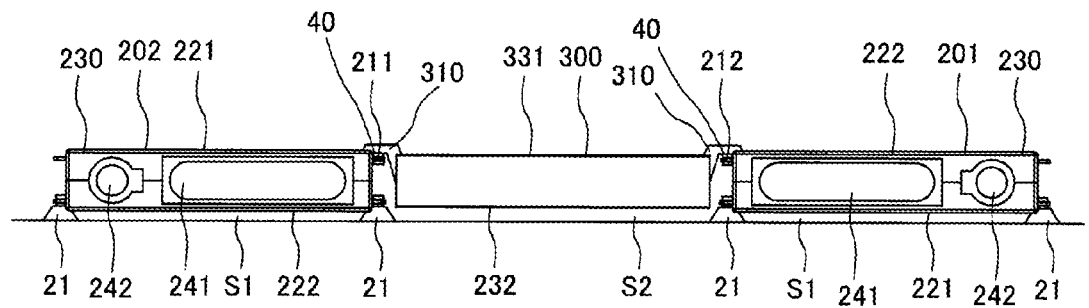
FIG. 8 is a front view of a first speaker unit, a second speaker unit and a third speaker unit.
Figure 9:
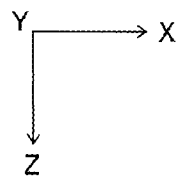
FIG. 9 is a perspective view of the first speaker unit and the third speaker unit.
Figure 9:
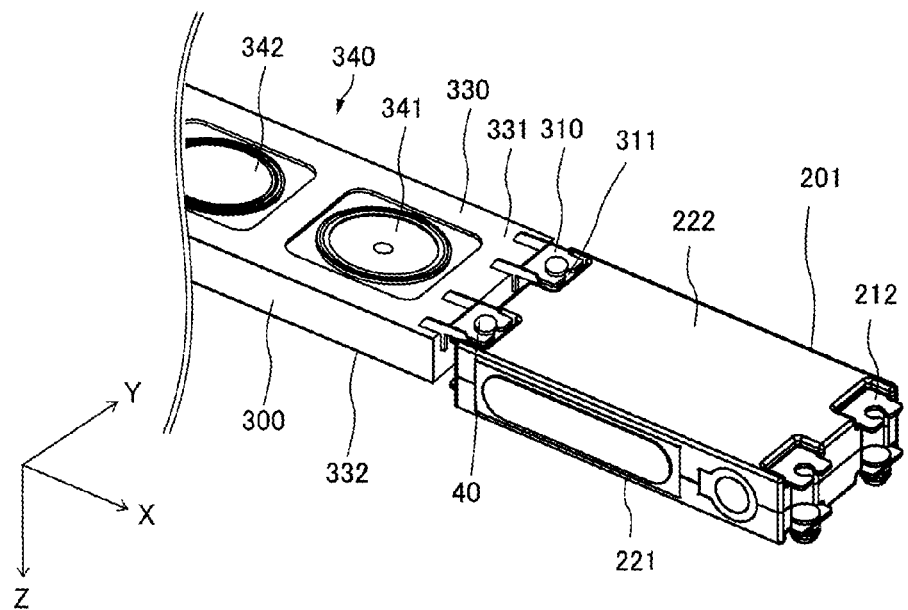

As shown in FIGS. 8 and 9, the third speaker unit 300 is provided with a speaker main body 330, a sound emitting portion 340, and a plurality of fourth fixing portions 310 that are provided to one surface 331 of the speaker main body 330 and are attachable to the second fixing portions 212 of the first speaker unit 201 and the first fixing portions 211 of the second speaker unit 202. The other surface 332 of the speaker main body 330 is disposed on the rear frame 20 side. The speaker main body 330 of the third speaker unit 300 contains, for example, a bass speaker and a treble speaker. In the second embodiment, the speaker main body 330 of the third speaker unit 300 contains a woofer and a passive radiator. On the one surface 331 of the speaker main body 330, a sound emitting portion 341 where the diaphragm of the woofer is disposed and a sound emitting portion 342 where the diaphragm of the passive radiator is disposed are provided. The fourth fixing portions 310 of the third speaker unit 300 are provided at the four corners of the one surface 331 of the speaker main body 330 and are provided protruding from the speaker main body 330 along the one surface 331 of the speaker main body 330. The fourth fixing portions 310 of the third speaker unit 300 are provided with third notches cut in an approximately circular shape in the same manner as the first fixing portions 211 and the second fixing portions 212. The third notches 311 are configured such that the connection members 40 for connecting and fixing with the first fixing portions 211 and the second fixing portions 212 can be fitted. The sound emitting portion 340 and the fourth fixing portions 310 are provided on the one surface 331 of the speaker main body 330, while the sound emitting portion 340 and the fourth fixing portions 310 are not provided on the other surface 332 of the speaker main body 330. The third speaker unit 300 is fixed to the first fixing portions 212 and the second fixing portions 212 via a gap S2 between the other surface 332 of the speaker main body 330 and the rear frame 20. The fixing structure of the third speaker unit 300 to the first fixing portions 211 and the second fixing portions 212 and the connection members 40 are the same as the fixing structure of the first speaker unit 201 and the second speaker unit 202 to the rear frame 20 and the connection members 40 according to the first embodiment, and thus the explanation thereof will be omitted. In FIG. 8, the fixing structure of the first speaker unit 201 and the third speaker unit 300 is illustrated, but the fixing structure of the second speaker unit 202 and the third speaker unit 300 is the same fixing structure, so the illustration is omitted. The third notches 311 may be cut into a polygonal shape or a rounded corner shape, and are not particularly limited.

Other configurations of the second embodiment are the same as those of the first embodiment above.
(Effect of Second Embodiment)

In the second embodiment, as described above, the third speaker unit 300 is further provided that is fixed by the second fixing portions 212 of the first speaker unit 201 and the first fixing portions 211 of the second speaker unit 202. With this configuration, it is not necessary to form a fixing portion for attaching and fixing the third speaker unit 300 to the rear frame by effectively utilizing the first fixing portions 211 or the second fixing portions 212 that are not fixed to the rear frame 20. Therefore, it is possible to attach and fix the third speaker unit 300 simply.

Other effects of the second embodiment are the same as those of the first embodiment.

Third Embodiment

Figure 10:
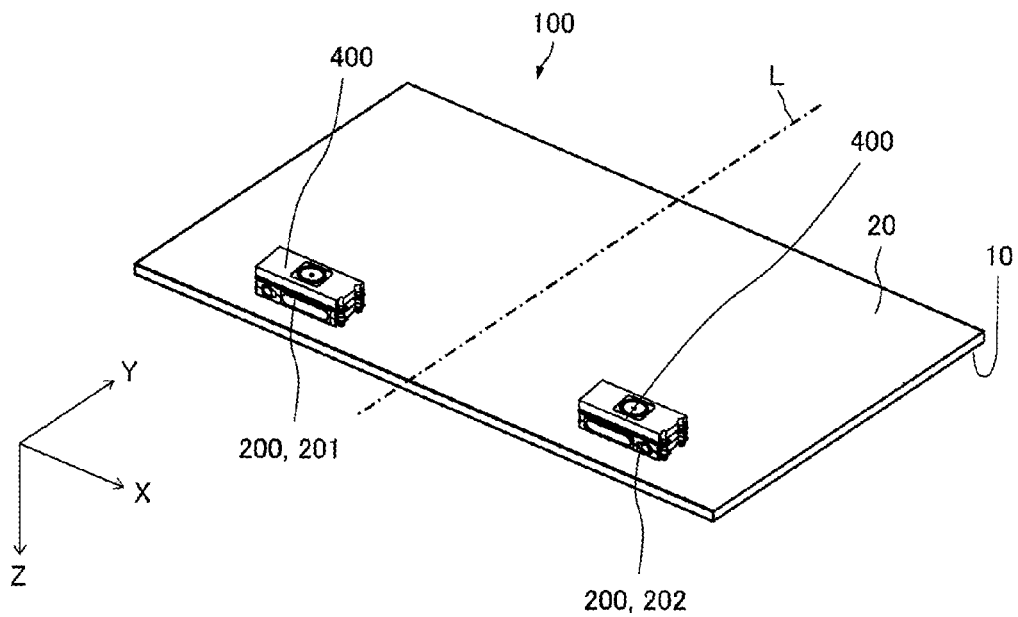
FIG. 10 is a perspective view of a display device according to a third embodiment with a rear cover removed, as view from a rear side.
Figure 11:
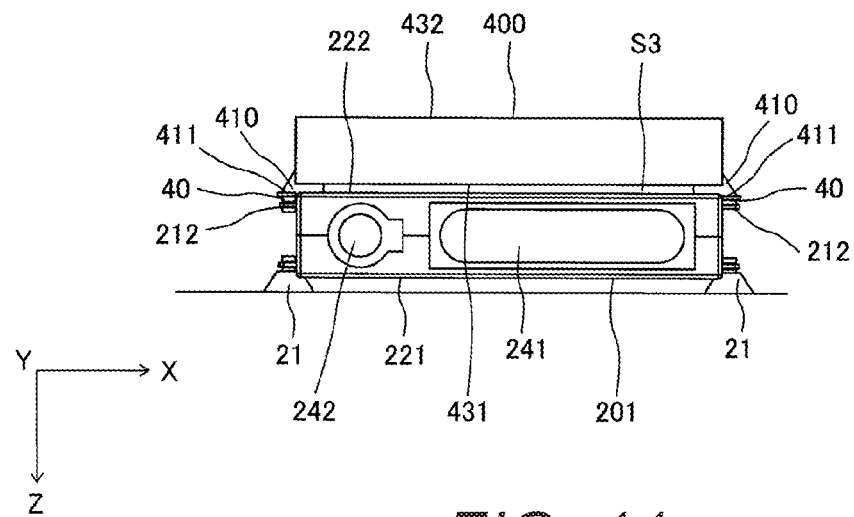
FIG. 11 is a front view of a first speaker unit and a fourth speaker unit.
Figure 12:
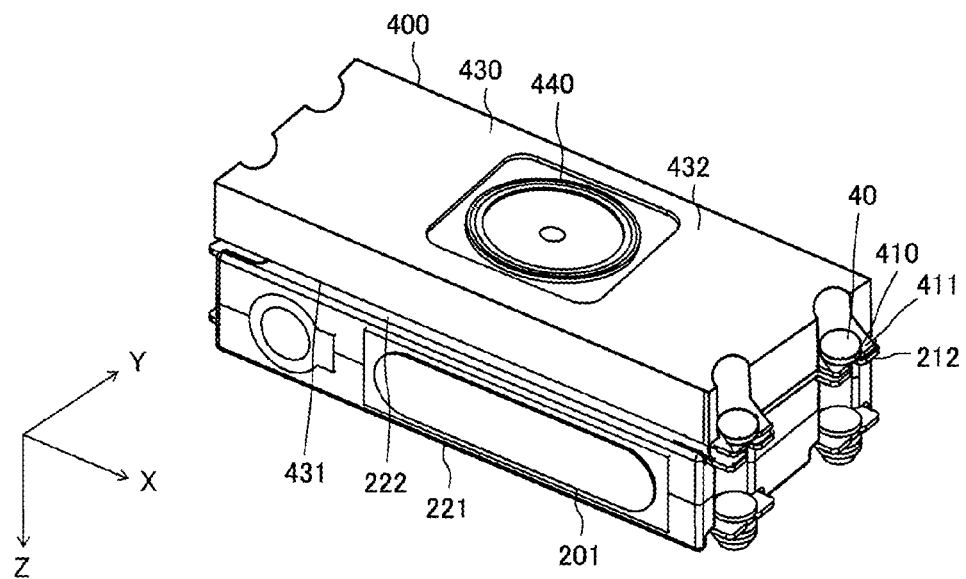
FIG. 12 is a perspective view of the first speaker unit and the fourth speaker unit.

Next, referring to FIGS. 10 to 12, the configuration of the display device 100 including the speaker units 200 according to a third embodiment will be described. Unlike the first embodiment, in the third embodiment, a fourth speaker unit 400 is further provided that is disposed on the second surface 222 of the first speaker unit 201 that is not fixed to the rear frame 20 and on the first surface 221 of the second speaker unit 202 that is not fixed to the rear frame 20, fixed by the second fixing portions 212 of the first speaker unit 201, and fixed by the first fixing portions 211 of the second speaker unit 202.

The fourth speaker unit 400 is provided with a speaker main body 430, a sound emitting portion 440, and a plurality of fifth fixing portions 410 that are provided to one surface 431 of the speaker main body 430 and are attachable to the second fixing portions 212 of the first speaker unit 201 or the first fixing portions 211 of the second speaker unit 202. The speaker main body 430 of the fourth speaker unit 400 contains, for example, a bass speaker and a treble speaker. In the third embodiment, the speaker main body 430 of the fourth speaker unit 400 contains a woofer. The one surface 431 of the speaker main body 430 is a surface on the rear frame 20 side. On the other surface 432 of the speaker main body 430 that is opposite to the one surface 431, the sound emitting portion 440 where the diaphragm of the woofer is disposed is provided. The fifth fixing portions 410 of the fourth speaker unit 400 are provided at the four corners of the one surface 431 of the speaker main body 430 and are provided protruding from the speaker main body 430 along the one surface 431 of the speaker main body 430. The fifth fixing portions 410 of the fourth speaker unit 400 are provided with fourth notches cut in an approximately circular shape in the same manner as the first fixing portions 211 and the second fixing portions 212. The fourth notches 411 are configured such that the connection members 40 for connecting and fixing with the first fixing portions 211 and the second fixing portions 212 can be fitted. On the one surface 431 of the speaker main body 430, the sound emitting portion 440 is not provided and the fifth fixing portions 410 are provided. On the other surface 432 of the speaker main body 430, the sound emitting portion 440 is provided and the fifth fixing portions 410 is not provided. The fourth speaker unit 400 is fixed to the first fixing portions 211 or the second fixing portions 212 via a gap S3 between the one surface 431 of the speaker main body 430 and the first speaker unit 201 or the second speaker unit 202. The fixing structure of the fourth speaker unit 400 to the first fixing portions 211 and the second fixing portions 212 and the connection members 40 are the same as the fixing structure of the first speaker unit 201 and the second speaker unit 202 to the rear frame 20 and the connection members 40 according to the first embodiment, and thus the explanation thereof will be omitted. In FIGS. 11 and 12, the fixing structure of the first speaker unit 201 and the fourth speaker unit 400 is illustrated, but the fixing structure of the second speaker unit 202 and the fourth speaker unit 400 is the same fixing structure, so the illustration is omitted. The fourth notches 411 may be cut into a polygonal shape or a rounded corner shape, and are not particularly limited.

Other configurations of the third embodiment are the same as those of the first embodiment above.
(Effect of Third Embodiment)

In the third embodiment, as described above, the fourth speaker unit 400 is further provided that is disposed on the second surface 222 of the first speaker unit 201 and on the first surface 221 of the second speaker unit 202, is fixed by the second fixing portions 212 of the first speaker unit 201, and is fixed by the first fixing portions 211 of the second speaker unit 202. With this configuration, it is not necessary to form a fixing portion for attaching and fixing the fourth speaker unit 400 to the rear frame 20 by effectively utilizing the first fixing portions 211 or the second fixing portions 212 that are not fixed to the rear frame 20. Therefore, it is possible to attach and fix the fourth speaker unit 400 simply.

Other effects of the third embodiment are the same as those of the first embodiment.

Fourth Embodiment

Figure 13:
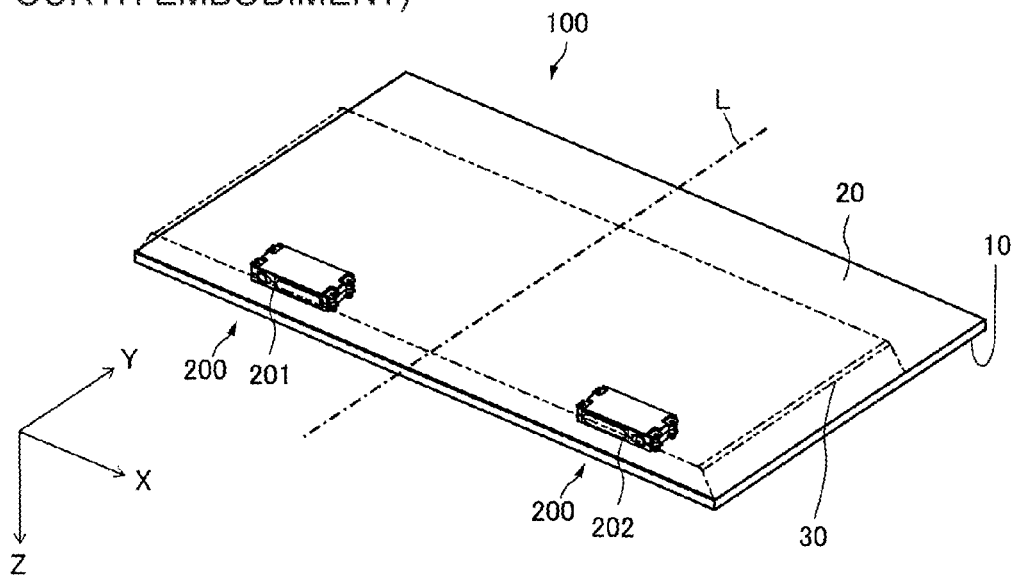
FIG. 13 is a perspective view of a display device according to a fourth embodiment with a rear cover removed, as viewed from a rear side.
Figure 14:
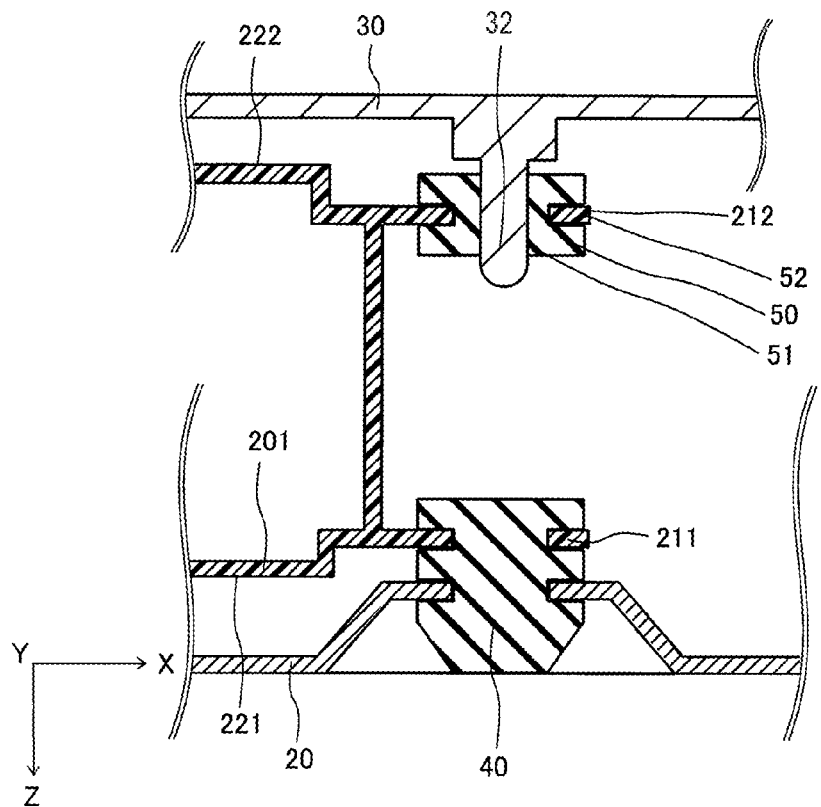
FIG. 14 a schematic cross-sectional view of an example of a connection structure between a first speaker unit and the rear cover.

Next, referring to FIGS. 13 and 14, the configuration of the display device including the speaker units 200 according to a fourth embodiment will be described. In addition to that the rear cover 30 is attached and fixed to the rear frame 20 by a fixing member not shown in the drawings, as in the first embodiment, in the fourth embodiment, the rear cover 30 is connected to the second fixing portions 212 of the first speaker unit 201 that is fixed to the rear frame 20 with the first fixing portions 211 and to the first fixing portions 211 of the second speaker unit 202 that is fixed to the rear frame 20 with the second fixing portions 212.

In this embodiment, cylindrical members 50 are fitted into the second notches 214 formed in the second fixing portions 212 of the first speaker unit 201 and the first notches 213 formed in the first fixing portions 211 of the second speaker unit 202. The cylindrical members 50 includes a through hole 51 and an annular recess 52 formed on a side surface. The first fixing portions 211 and the second fixing portions 212 are fitted into the recesses 52 of the cylindrical members 50, thereby attaching and fixing the cylindrical members 50 to the first speaker unit 201 or the second speaker unit 202. The cylindrical members 50 are formed, for example, of an elastic body. The cylindrical members 50 are formed, for example, of the same material as the connection members 40. The rear cover 30 is provided with convex mating portions 32 that can be mated with the cylindrical members 50 that are attached to the first fixing portions 211 or the second fixing portions 212 at positions opposite to the second fixing portions 212 of the first speaker unit 201 that is fixed to the rear frame 20 with the first fixing portions 211 and positions opposite to the first fixing portions 211 of the second speaker unit 202 that is fixed to the rear frame 20 with the second fixing portions 212. The diameter of the mating portions 32 of the rear cover 30 is larger than the diameter of the through holes 51 of the cylindrical members 50. The mating portions 32 of the rear cover 30 are pushed into and inserted through the through holes 51 of the cylindrical members 50, thereby connecting the rear cover 30 to the second fixing portions 212 of the first speaker unit 201 and the first fixing portions 211 of the second speaker unit 202. As a result, the first speaker unit 201 and the second speaker unit 202 are supported by the rear frame 20 from one side and are supported by the rear cover 30 from the other side. In the FIG. 14, the connection structure between the first speaker unit 201 and the rear cover 30 and the rear frame 20 is illustrated, but the connection structure between the second speaker unit 202 and the rear cover 30 and the rear frame 20 is the same connecting structure, so the illustrating is omitted.

Other configurations of the fourth embodiment is the same as those of the first embodiment above.

(Effect of Fourth Embodiment)

In the fourth embodiment, as described above, the rear cover 30 is further provided that is provided on the opposite side of the speaker units 200 relative to the rear frame 20 and is connected to the second fixing portions 212 of the first speaker unit 201 that is fixed to the rear frame 20 with the first fixing portions 211 and to the first fixing portions 211 of the second speaker unit 202 that is fixed to the rear frame 20 with the second fixing portions 212. Here, the rear cover 30 covering the speaker unit 200 disposed on the rear frame 20 vibrates due to the transmission of the sound output from the speaker unit 200. Due to this vibration of the rear cover 30, the rear cover 30 may interfere with protective members for protecting terminals and other components, resulting in interference noise (chattering noise). In addition, the rear cover 30 may be deformed due to temperature rise of a space between the rear cover 30 and the rear frame 20 caused by the increase in heat generation of the display 10 due to high brightness and high image quality. With the configuration as described above, the number of fixing points of the rear cover 30 in the display device 100 can be increased by effectively utilizing the first fixing portions 211 or the second fixing portions 212 that are not fixed to the rear frame 20. Therefore, by suppressing the vibration of the rear cover 30, the generation of interference noise (chattering noise) caused by the vibration of the rear cover 30 can be suppressed, and the deformation of the rear cover 30 caused by temperature rise can be suppressed.

In addition, other effects of the fourth embodiment are the same as those of the first embodiment.

Fifth Embodiment

Figure 15:
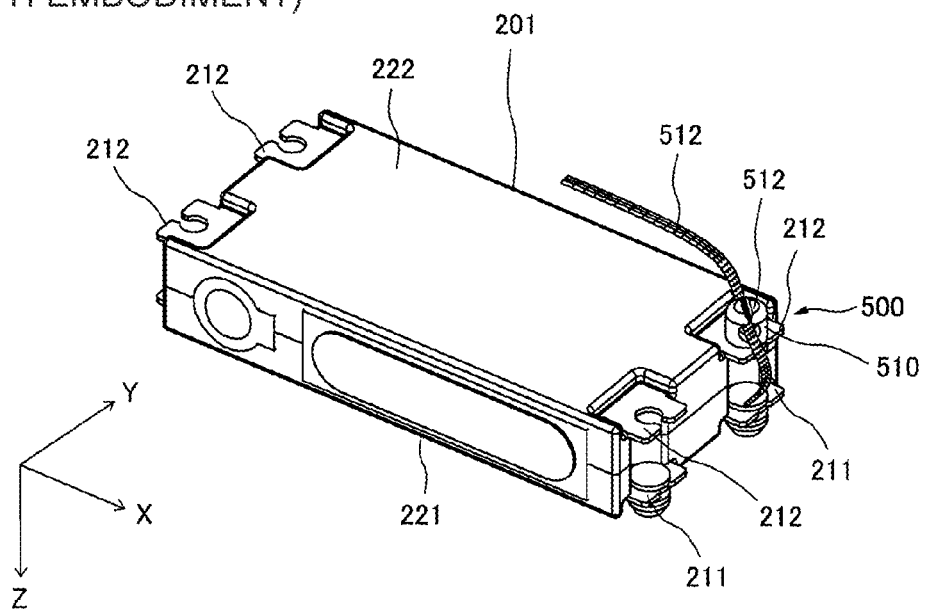
FIG. 15 is a perspective view of a first speaker unit and a component holding member 500 according to a fifth embodiment.
Figure 16:
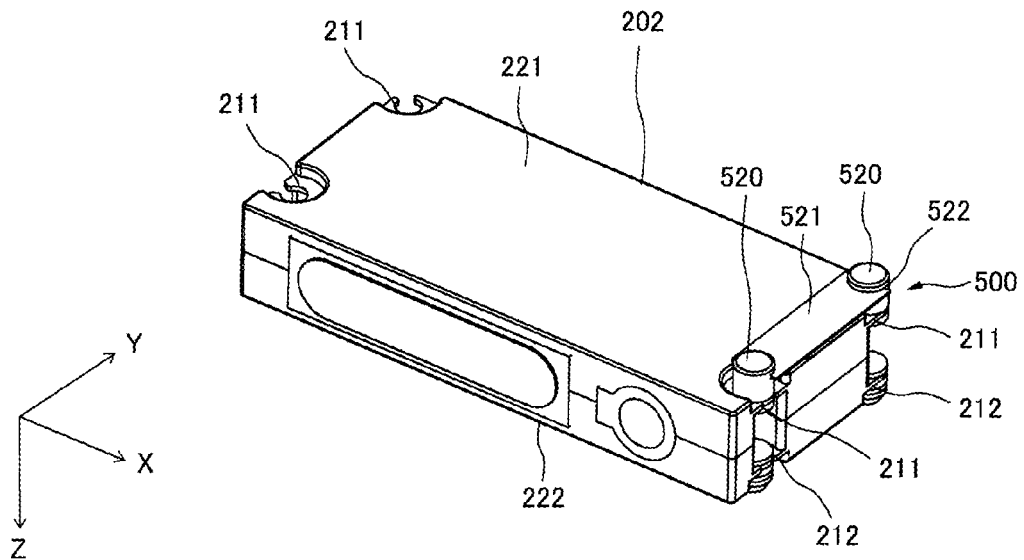
FIG. 16 is a perspective view of a second speaker unit and a component holding member 500 according to the fifth embodiment.

Next, referring to FIGS. 15 and 16, the configuration of the display device 100 including the speaker units 20 according to a fifth embodiment will be described. Unlike the first embodiment, in the fifth embodiment, a component holding member 500 is further provided for holding a component and that is fixed to at least one of the second fixing portions 212 of the first speaker unit 201 that is not fixed to the rear frame 20 and the first fixing portions 211 of the second speaker unit 202 that is not fixed to the rear frame 20.

As the component holding member 500, for example, a wiring holding member 510 is listed that is provided with a fitting portion 512 into which wiring 511 can be fitted in order to prevent the wring 511 for connecting the inside of the speaker unit 200 and the outside of the speaker unit 200 or the wiring 511 arranged around the speaker unit 200 from being entangled. Also, as the component holding member 500, for example, substrate holding members 520 are listed in which a recess 522 for sandwiching and holding a substrate 521, such as a WiFi (registered trademark) substrate or a Bluetooth (registered trademark) substrate, etc. is formed. The components and the component holding member 500 are not limited to the above-mentioned wiring 511 and substrate 521, and the wiring holding member 510 and the substrate holding members 520. In addition, in this embodiment, the substrate holding members 520 are provided not in the two fixing portions 211 and 212 on the side where the bass speaker is contained, but in each of the two fixing portions 211 and 212 on the side where the treble speaker is contained. In FIG. 15, the fixing structure of the first speaker unit 201 and the wiring holding member 510 is illustrated, but the fixing structure of the second speaker unit 202 and the wiring holding member 510 is the same fixing structure, so the illustration is omitted. In addition, in FIG. 16, the fixing structure of the second speaker unit 202 and the substrate holding members 520 is illustrated, but the fixing structure of the first speaker unit 201 and the substrate holding members 520 is the same fixing structure, so the illustration is omitted. In addition, the substrate holding members 520 may be provided in each of the two fixing portions 211 and 212 on the side where the bass speaker is contained, and the installation locations of the substrate holding members 520 are not particularly limited.

Other configurations of the fifth embodiment are the same as those of the first embodiment above.

(Effect of Fifth Embodiment)

In the fifth embodiment, as described above, the component holding member 500 is further provided for holding a component and that is fixed to at least one of the second fixing portions 212 of the first speaker unit 201 and the first fixing portions 211 of the second speaker unit 202. With this configuration, by effectively utilizing the first fixing portions 211 or the second fixing portions 212 that are not fixed to the rear frame 20, it is not necessary to form a fixing portion for attaching and fixing a component to the rear frame 20. Therefore, it is possible to attach and fix a component simply. In addition, the substrate 521 is held by the substrate holding members 520 provided in each of the two fixing portions 211 and 212 on the side where the treble speaker is contained, and thus it is possible to suppress the transmission of vibration to the substrate 521 relative to when the substrate 521 is held by the substrate holding members 521 provided in each of the two fixing portions 211 and 212 on the side where the bass speaker that vibrates more than the treble speaker is contained.

In addition, other effects of the fifth embodiment are the same as those of the first embodiment.

Sixth Embodiment

Figure 17:
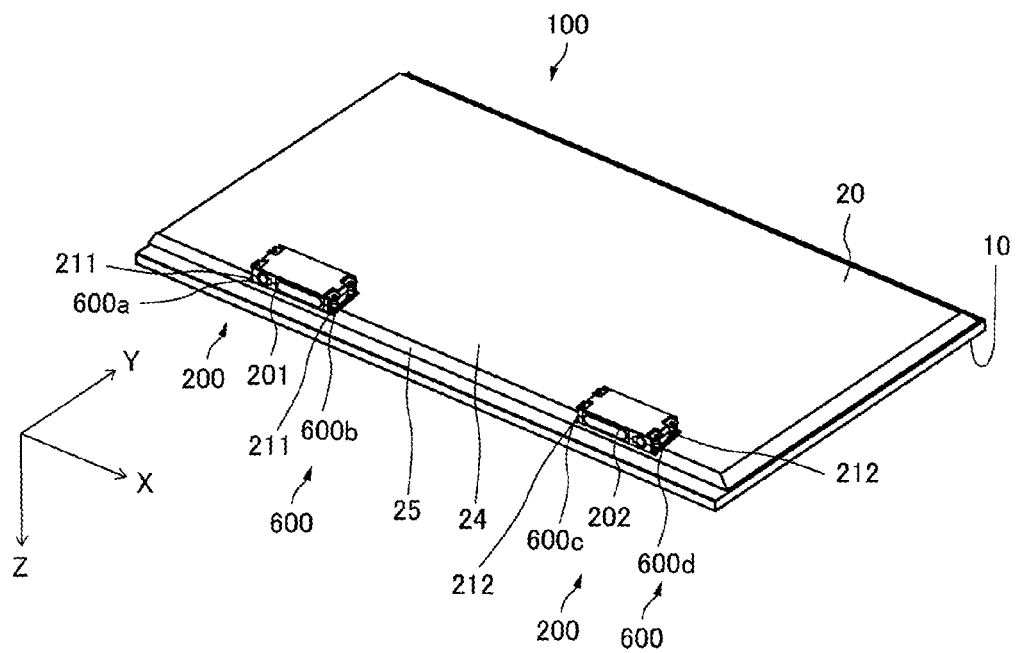
FIG. 17 is a perspective view of an arrangement example 3 of first and second speaker units according to a sixth embodiment.
Figure 18:
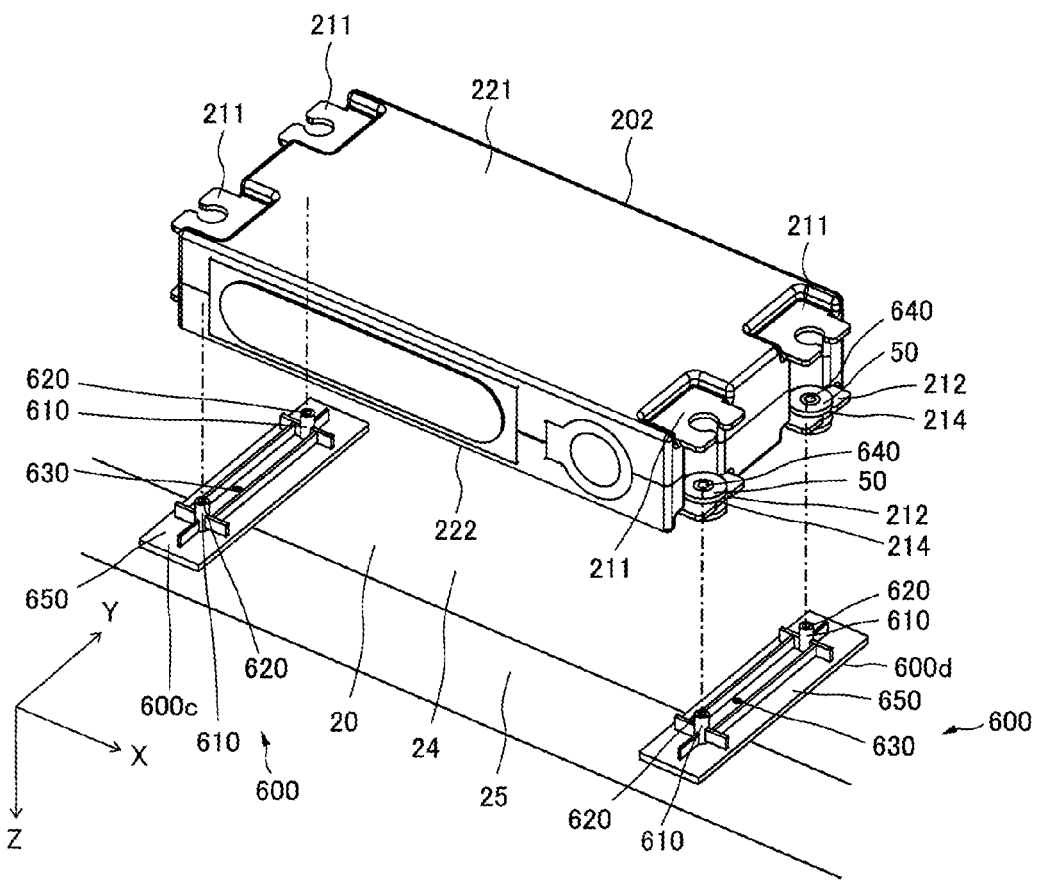
FIG. 18 is a perspective view of a second speaker unit and an example 1 of a speaker unit attaching member according to the sixth embodiment.

Next, referring to FIGS. 17 and 18, the configuration of the display device 100 including the speaker units 200 according to a sixth embodiment will be described. Unlike the first embodiment, in the sixth embodiment, as shown in FIG. 17, speaker unit attaching members 600 is further provided for attaching the speaker units 200 and that is provided to the rear frame 20. The speaker unit attaching members 600 include speaker unit attaching members 600a to 600d. The first fixing portions 211 of the first speaker unit 201 are attached and fixed to the rear frame 20 via the speaker unit attaching member 600a and the speaker unit attaching member 600b. The second fixing portions 212 of the second speaker unit 202 are attached and fixed to the rear frame 20 via the speaker unit attaching member 600c and the speaker unit attaching member 600d. The rear frame 20 and the speaker unit attaching members 600 are examples of "rear side members" of the claims.

The speaker unit attaching member 600a connects the first fixing portions 211 on one side of the first speaker unit 201 in the left-right direction to the rear frame 20. The speaker unit attaching member 600b connects the first fixing portions 211 on the other side of the first speaker unit 201 in the left-right direction to the rear frame 20. The speaker unit attaching member 600c connects the second fixing portions 212 on one side of the second speaker unit 202 in the left-right direction to the rear frame 20. The speaker unit attaching member 600d connects the second fixing portions 212 on the other side of the second speaker unit 202 in the left-right direction to the rear frame 20. As shown in FIG. 18, the speaker unit attaching members 600 include a planar member 650 and columnar members 610 formed on the planar member 650. The speaker unit attaching members 600 are fixed to the rear frame 20 by screws 630. Parts of the speaker unit attaching members 600 are disposed protruding from a rear surface 24 and a bottom surface 24 of the rear frame 20. The first notches 213 (see FIG. 4) formed in the first fixing portions 211 of the first speaker unit 201 and the second notches 214 formed in the second fixing portions 212 of the second speaker unit 202 are fitted with the cylindrical members 50. The cylindrical members 50 are the same as those of the fourth embodiment and include the through hole 51 and the annular recess 52 (FIG. 14). The columnar members 610 of the speaker unit attaching members 600 have a screw holes 620. The columnar members 610 are configured to be insertable into the cylindrical members 50 that are fitted into the first fixing portions 211 or the second fixing portions 212. With the speaker unit attaching members 600, the columnar members 610 are inserted into the through holes 51 of the cylindrical members 50 and screws 640 with washers are engaged to the screw holes 620 of the columnar member 610. With this configuration, the first fixing portions 211 of the first speaker unit 201 are attached and fixed to the rear frame 20 via the speaker unit attaching members 600a and 600b, and the second fixing portions 212 of the second speaker unit 202 are attached and fixed to the rear frame 20 via the speaker unit attaching members 600c and 600d. The speaker unit attaching members 600 may be molded by resin, formed by pressing sheet metal, or formed by die casting. In FIG. 18, the fixing structure of the second speaker unit 202 and the rear frame 20 via the speaker unit attaching members 600c and 600d is illustrated, but the fixing structure of the first speaker unit 201 and the rear frame 20 via the speaker unit attaching members 600a and 600b is the same fixing structure, so the illustration is omitted.

Other configurations of the sixth embodiment are the same as those of the first embodiment above.

(Effect of Sixth Embodiment)

In the sixth embodiment, as described above, the speaker unit attaching members 600 is further provided that is provided to the rear frame 20 and for attaching the speaker units 200, the first fixing portions 211 are attached and fixed to the rear frame 20 via the speaker unit attaching members 600a and 600b in the first speaker unit 201, and the second fixing portions 212 are attached and fixed to the rear frame 20 via the speaker unit attaching members 600c and 600d in the second speaker unit 202. With this configuration, the first speaker unit 201 and the second speaker unit 202 can be simply attached and fixed to the rear frame 20 via the speaker unit attaching members 600 even when the rear frame 20 cannot be provided with a fixing portion for fixing the first fixing portions 211 of the first speaker unit 201 and the second fixing portions 212 of the second speaker unit 202 duet to the positioning of the first speaker unit 201 and the second speaker unit 202, the rear frame 20 is not provided with a fixing portion for fixing the first fixing portions 211 of the first speaker unit 201 and the second fixing portions 212 of the second speaker unit 202, or different speaker units 200 of different sizes or shapes are desired to be used.

In addition, other effects of the sixth embodiment are the same as those of the first embodiment.

Modification Examples

The embodiments disclosed herein should be considered as exemplary and not restrictive in all respects. The scope of the invention is indicated by the claims, not by the description of the embodiments described above, and further includes all modifications (modification examples) within the meaning and scope of the claims and their equivalents.

For example, in the first to fifth embodiments above, examples of the display device 100 including the speaker units 200 are illustrated, but the present invention is not limited to this. The speaker units 200 may be attached and fixed to a device other than the display device 100.

Figure 19:
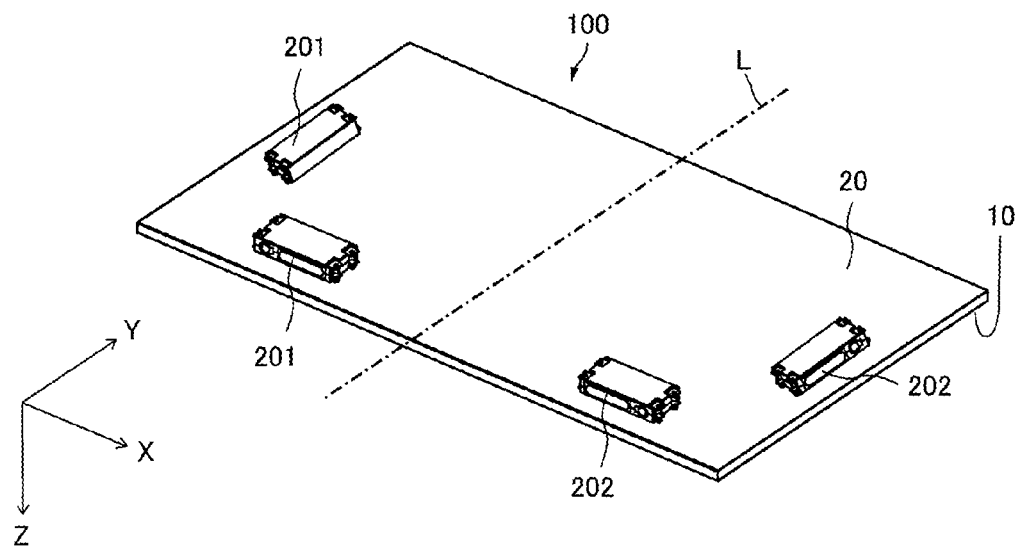
FIG. 19 is a perspective view of an arrangement example 1 of first and second speaker units according to a modification example.
Figure 20:
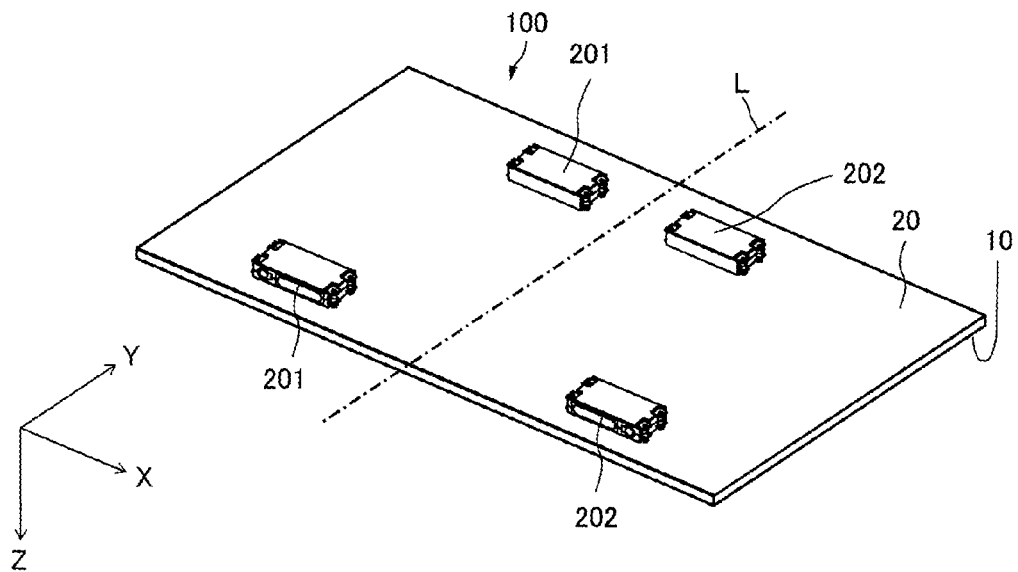
FIG. 20 is a perspective view of an arrangement example 2 of first and second speaker units according to a modification example.

In the first embodiment above, an example is illustrated in which, as the speaker units 200, one first speaker unit 201 is disposed at the lower left side of the rear frame 20 when viewed from the rear side of the display device 100, and one second speaker unit 202 is disposed at the lower right side of the rear frame 20 when viewed from the rear side of the display device 100, but the present invention is not limited to this. As shown in FIG. 19, another first speaker unit 201 can be further disposed at a center of the left side of the rear frame 20 when viewed from the rear side of the display device 100, and another second speaker unit 202 can be further disposed at a center of the right side of the rear frame 20 when viewed from the rear side of the display device 100. Also, as shown in FIG. 20, another first speaker unit 201 can be further disposed at an upper left side of the rear frame 20 when viewed from the rear side of the display device 100, and another second speaker unit 202 can be further disposed at an upper right side of the rear frame 20 when viewed from the rear side of the display device 100.

Figure 21:
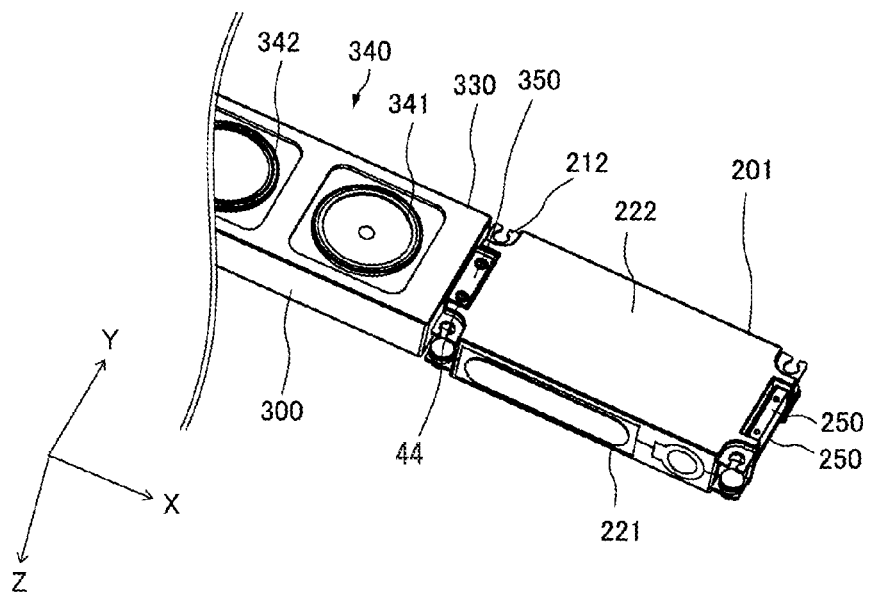
FIG. 21 is a perspective view of a connection example 1 of a first speaker unit and other speaker unit according to a modification example.

In the second embodiment above, an example is illustrated in which the third speaker unit 300 is fixed by the second fixing portions 212 of the first speaker unit 201 and the first fixing portions 211 of the second speaker unit 202, but the present invention is not limited to this. As shown in FIG. 21, the third speaker unit 300 can be fixed by connecting first connection parts 250 further provided to the first speaker unit 201 and first connection parts 250 further provided to the second speaker unit 202 to second connection parts 350 further provided to the third speaker unit 300 via connection members 44. For example, the first and second speaker units 201 and 202 each further include the first connection parts 250 provided at positions that do not interfere with the first fixing portions 211 and the second fixing portions 212 at the side surface 223, and the third speaker unit 300 further includes the second connection parts 350 provided at positions that do not interfere with the first fixing portions 211 and the second fixing portions 212 at a side surface of the third speaker unit 300 and correspond to the first connection parts 250 of the first and second speaker units 201 and 202. The screw holes formed in the first connection parts 250 of the first and second speaker units 201 and 202, and the screw holes formed in the second connection parts 350 of the third speaker unit 300 are connected via screws that are the connection members 44. With this configuration, the third speaker unit 300 can be attached and fixed to the first and second speaker units 201 and 202, the component holding member 500 can be fixed to the first fixing portions 211 or the second fixing portions 212 that are not fixed to the rear frame 20. In FIG. 21, only the fixing structure of the first speaker unit 201 and the third speaker unit 300 is illustrated, but the fixing structure of the second speaker unit 202 and the third speaker unit 300 is the same fixing structure, so the illustration is omitted.

Figure 22:
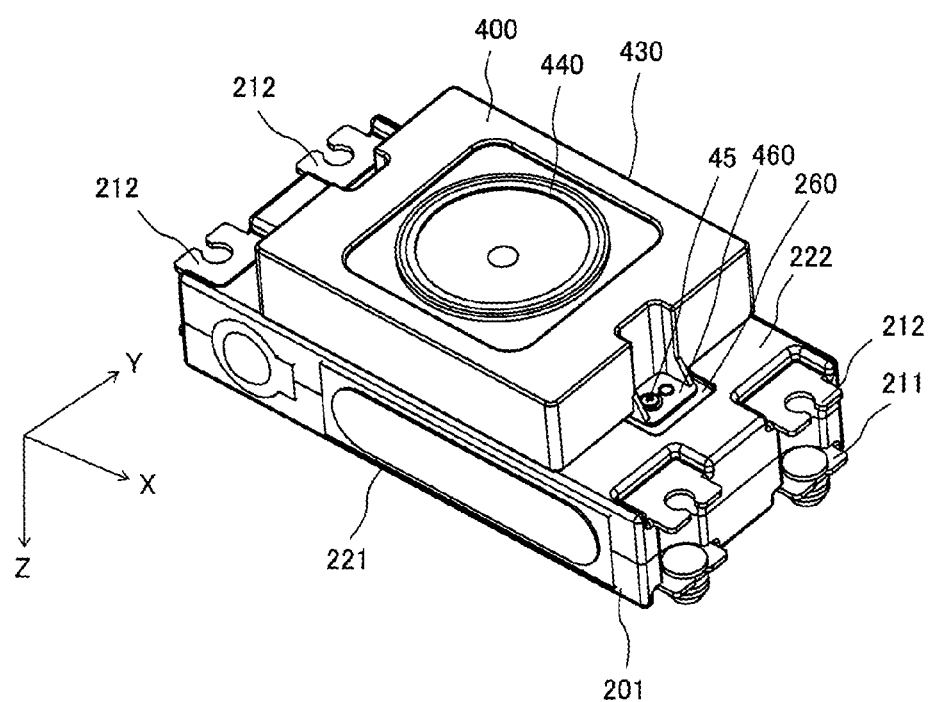
FIG. 22 is a perspective view of a connection example 2 of a first speaker unit and other speaker unit according to a modification example.

In the third embodiment above, an example is illustrated in which the fourth speaker unit 400 is fixed on the second surface 222 of the first speaker unit 202 by the second fixing portions 212 and on the first surface 221 of the second speaker unit 202 by the first fixing portions 211, but the present invention is not limited to this. As shown in FIG. 22, the fourth speaker unit 400 can be fixed on the second surface 222 of the first speaker unit 201 by connecting third connection parts 260 further provided to the first speaker unit 201 and fourth connection parts 460 further provided to the fourth speaker unit 400 via connection members 45, instead of the second fixing portions 212, on the second surface 222 of the first speaker unit 201. Also, the fourth speaker unit 400 can be fixed on the first surface 221 of the second speaker unit 202 by connecting third connection parts 260 further provided to the second speaker unit 202 and the fourth connection parts 460 further provided to the fourth speaker unit 400 via the connection members 45, instead of the first fixing portions 211, on the first surface 221 of the second speaker unit 202. For example, the first and second speaker units 201 and 202 each further include the third connection parts 260 provided at positions that do not interfere with the first fixing portions 211 and the second fixing portions 212 in the first surface 221 and the second surface 222, and the fourth speaker unit 400 further includes the fourth connection parts 460 provided at positions that correspond to the third connection parts 260 of the first and second speaker units 201 and 202 in a surface that is attached to the first and second speaker units 201 and 202. The screw holes formed in the third connection parts 260 of the first and second speaker units 201 and 202 and the screw holes formed in the fourth connection parts 460 of the fourth speaker unit 400 are connected via the screws that are the connection members 45. With this configuration, the fourth speaker unit 400 can be attached and fixed on the second surface 222 of the first speaker unit 201 and on the first surface 221 of the second speaker unit 202, and the component holding member 500 can be fixed to the first fixing portions 211 or the second fixing portions 212 that are not fixed to the rear frame 20. In FIG. 22, only the fixing structure of the first speaker unit 201 and the fourth speaker unit 400 is illustrated, but the fixing structure of the second speaker unit 202 and the fourth speaker unit 400 is the same fixing structure, so the illustration is omitted.

Figure 23:
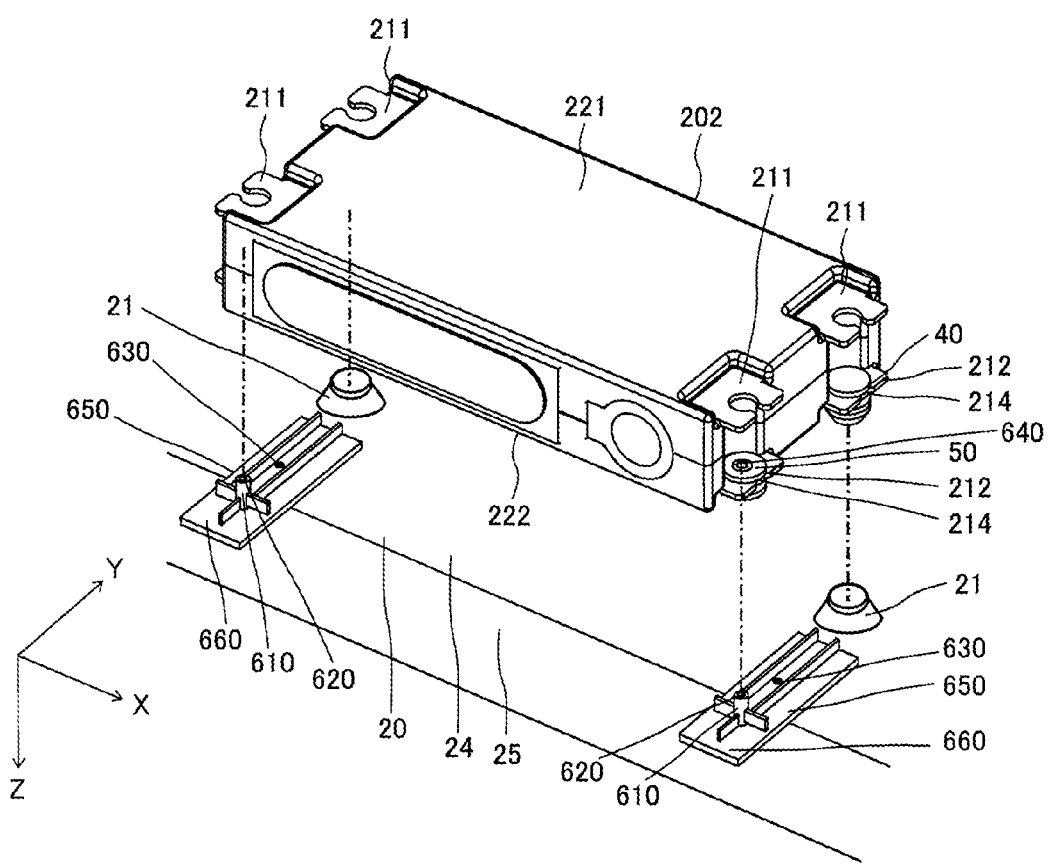
FIG. 23 is a perspective view of a second speaker unit and an example 2 of a speaker unit attaching member according to a modification example.

In the sixth embodiment above, an example is illustrated in which the speaker unit attaching members 600 connect all the first fixing portions 211 on one side in the left-right direction to the rear frame 20 and connect all the first fixing portions 211 on the other side to the rear frame 20 in the first speaker unit 201, and connect all the second fixing portions 212 on the one side in the left-right direction to the rear frame 20 and connect all the second fixing portions 212 on the other side to the rear frame 20 in the second speaker unit 202, but the present invention is not limited to this. For example, with speaker unit attaching members 660, a part of the second fixing portions 212 of the second fixing portions 212 on the one side in the left-right direction in the second speaker unit 202 can be fixed to the rear frame 20 via the speaker unit attaching members 660, and the rest of the second fixing portions 212 on the one side can be connected and fixed to the rear frame side fixing portions 21. In this case, a part of the second fixing portions 212 of the second fixing portions 212 on the other side in the left-right direction in the second speaker unit 202 is fixed to the rear frame 20 via the speaker unit attaching members 660, and the rest of the second fixing portions 212 on the other side is connected and fixed to the rear frame side fixing portions 21. In this modification example, as shown in FIG. 23, unlike the speaker unit attaching members 600 of the sixth embodiment in which two columnar members 610 are formed, the speaker unit attaching members 660 have one columnar member 610. The first fixing portions 211 of the first speaker unit 201 is also fixed in the same manner as the second fixing portions 212 of the second speaker unit 202. Therefore, the illustration of the fixing structure of the first speaker unit 201 and the rear frame 20 via the speaker unit attaching members 660 is omitted.

Figure 24:
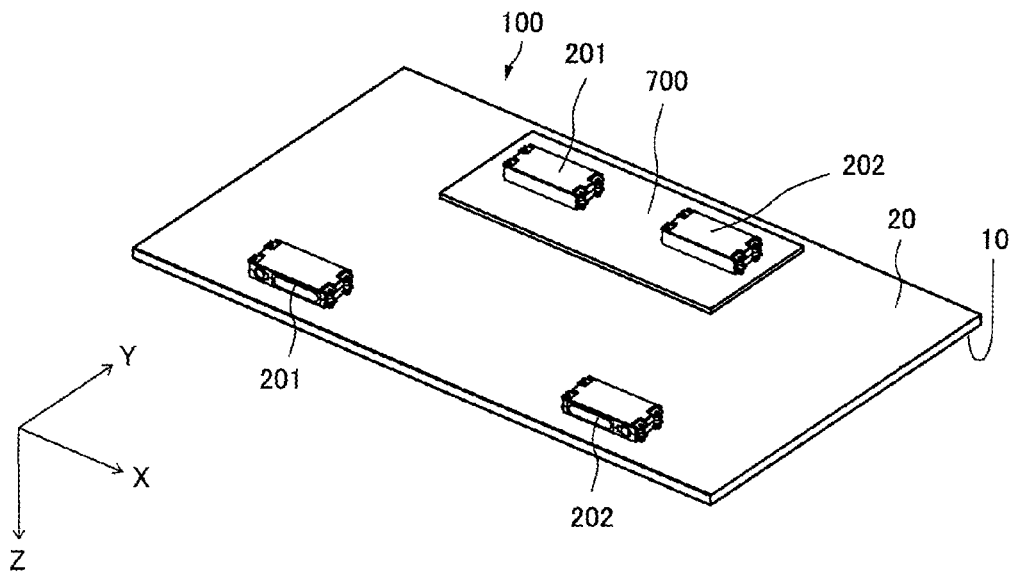
FIG. 24 is a perspective view of an arrangement example 4 of first and second speaker units according to a modification example.
Figure 25:
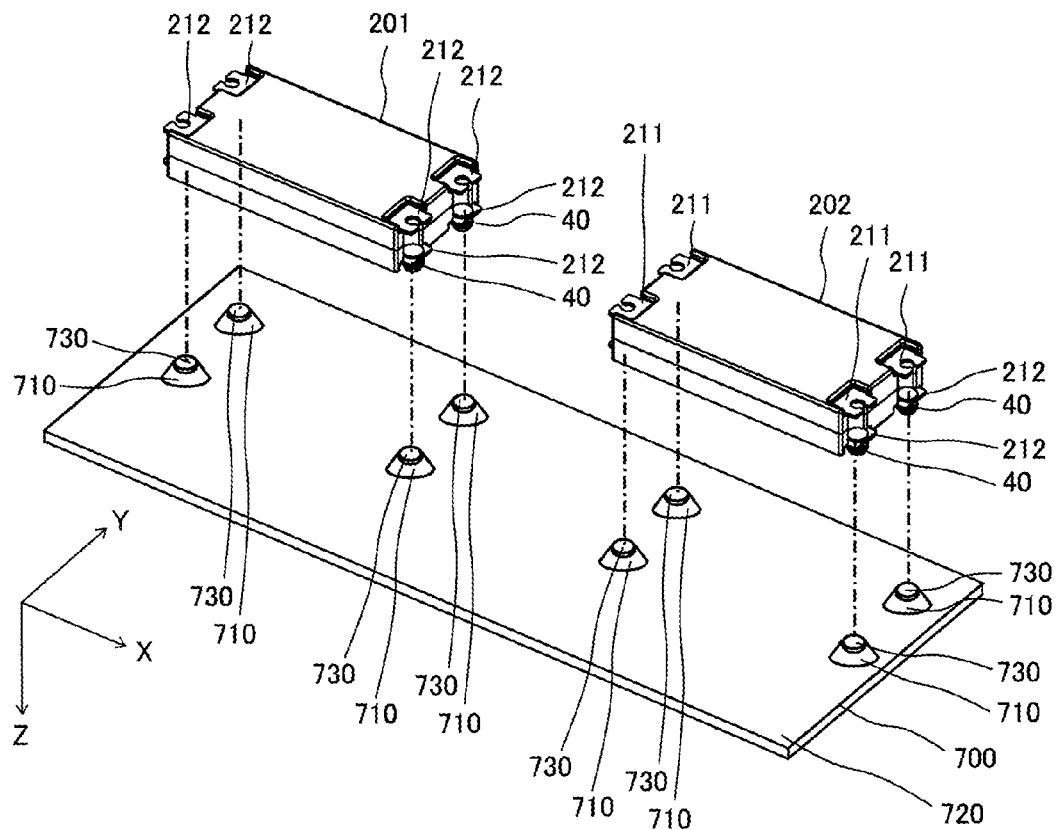
FIG. 25 is a perspective view of a second speaker unit and an example 3 of a speaker unit attaching member according to a modification example.

Also, for example, as shown in FIGS. 24 and 25, a speaker unit attaching member 700 can be formed of a planar member 720 (see FIG. 25) on which a speaker unit attaching member side fixing portions 710 (see FIG. 25) similar to the rear frame side fixing portions 21. As shown in FIG. 25, the speaker unit attaching member 700 includes the planar member 720 and the speaker unit attaching member side fixing portions 710 having a conical shape and in which a hole 730 is formed on a protruding surface. The speaker unit attaching member 700 is fixed to the rear frame 20 by double-sided tape, magnets, screws, etc. The first speaker unit 201 and the second speaker unit 202 are fixed to the speaker unit attaching member side fixing portions 710 formed on the planar member 720 via the connection members 40 including the lower part 41 having the dome shape and the upper part 42 having the column shape according to the first embodiment. The first speaker unit 201 and the second speaker unit 202 are fixed to the speaker unit attaching member side fixing portions 710 by the lower parts 41 of the connection members 40 being fitted into the holes 730. The speaker unit attaching member 700 may be molded by resin, formed by pressing sheet metal, or formed by die casting.

Also, for example, a speaker unit attaching member (not shown) may be formed by integrating two speaker unit attaching members 600 used for each of the first and second speaker units in the sixth embodiment. Also, for example, a speaker unit attaching member (not shown) may be integrated with a member covering lower edges of the display 10 and the rear frame 20, or a stand bracket for connecting the stand 11 and the rear frame 20, or may be combined with these members.

In the first to fifth embodiments above, examples are illustrated in which the first and second speaker units 201 and 202 are attached and fixed to the rear frame side fixing portions 21 of the rear frame 20, and in the sixth embodiment above, an example is illustrated in which the first and second speaker units 201 and 202 are fixed to the rear frame 20 via the speaker unit attaching member 600, but the present invention is not limited to this. For example, the first and second speaker units 201 and 202 can be attached and fixed to an attaching member (not shown) attached to any part other than the rear frame 20 of the display device 100.

Figure 26:
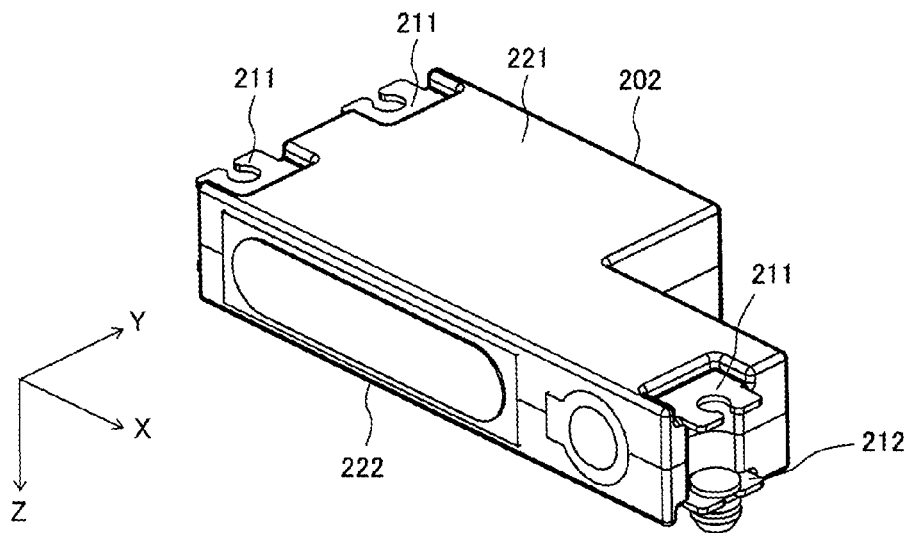
FIG. 26 is a perspective view of an example 1 of a second speaker unit according to a modification example.

In the first embodiment above, an example is illustrated in which the speaker units 200 are configured such that the first surface 221 and the second surface 222 have a rectangular shape, two of the fixing portions of the first fixing portions 211 are provided along each of mutually parallel sides of the first surface 221, and two of the fixing portions of the second fixing portions 212 are provided along each of mutually parallel sides of the second surface 222, but the present invention is not limited to this. For example, the speaker units 200 can be configured such that the first surface 221 and the second surface 222 have an L-shape. As shown in FIG. 26, the second speaker unit 202 is configured such that the first surface 221 and the second surface 222 have an L-shape. Two of the fixing portions of the first fixing portions 211 are provided on one side of the first surface 221 in the left-right direction, while one of the fixing portions of the first fixing portions 211 is provided on the other side. The illustration of the first speaker unit 201 is omitted.

Figure 27:
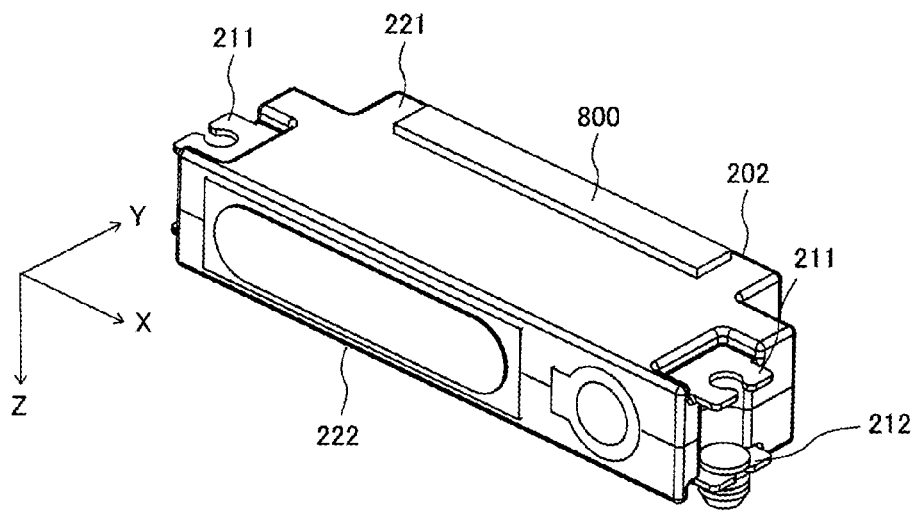
FIG. 27 is a perspective view of an example 2 of a second speaker unit according to a modification example.

Also, the speaker units 200 can be configured such that the first surface 221 and the second surface 222 have a convex shape. As shown in FIG. 27, the second speaker unit 202 is configured such that the first surface 221 and the second surface 222 have a convex shape. One of the fixing portions of the first fixing portions 211 are provided on each of one side and the other side of the first surface 221 protruding in the left-right direction, while one of the fixing portions of the second fixing portions 212 are provided on each of one side and the other side of the second surface 222 protruding in the left-right direction. In addition, cushioning members 800 for absorbing the vibration of the second speaker unit 202 are provided on portions of the first surface 221 and the second surface 222 that have depressions in the left-right direction. The illustration of the first speaker unit 201 is omitted. The speaker units 200 can be configured to be sandwiched between the rear frame 20 and the rear cover 30 via the cushioning members 800 on the first surface 221 and the second surface 222. With this configuration, even when the number of fixing portions of the first fixing portions 211 and the second fixing portions 212 is reduced, the vibration of the speaker units 200 can be suppressed.

Figure 28:
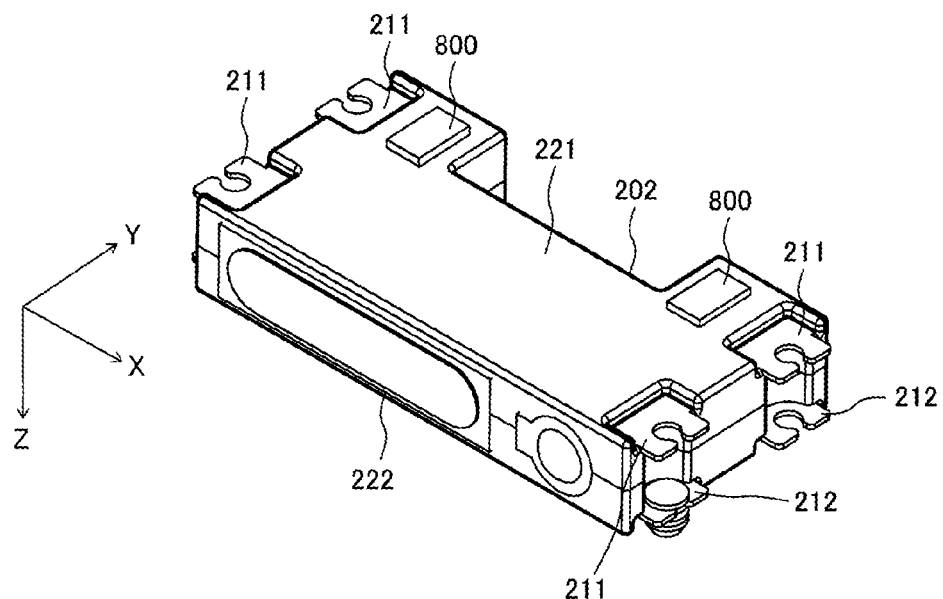
FIG. 28 is a perspective view of an example 3 of a second speaker unit according to a modification example.

Also, the speaker units 200 can be configured such that the first surface 221 and a second surface 222 have a concave shape. As shown in FIG. 28, the second speaker unit 202 is configured such that the first surface 221 and the second surface 222 have a concave shape. As in the first embodiment, two of the fixing portions of the first fixing portions 211 are provided along each of mutually parallel sides of the first surface 221, and two of the fixing portions of the second fixing portions 212 are provided along each of mutually parallel sides of the second surface 222. Unlike the first embodiment, the second fixing portions 212 provided in portions with depressions in the left-right direction on the second surface 222 are not fixed to the rear frame side fixing portions 21. Also, the cushioning members 800 are provided on the portions with the depressions in the left-right direction on the first surface 221 and the second surface 222. The cushioning members 800 may be configured to be sandwiched between the rear frame 20 and the rear cover 30. The illustration of the first speaker unit 201 is omitted.

Figure 29:
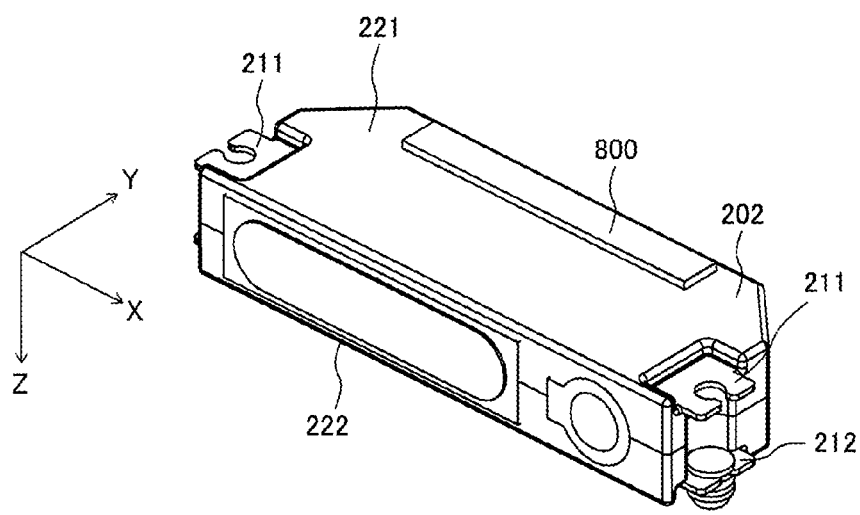
FIG. 29 is a perspective view of an example 4 of a second speaker unit according to a modification example.

Also, the speaker units 200 can be configured such that the first surface 221 and the second surface 222 have a shape in which a trapezoidal shape and a rectangular shape are combined. As shown in FIG. 29, the second speaker unit 202 is configured such that the first surface 221 and the second surface 222 have a shape in which a trapezoidal shape and a rectangular shape are combined. One of the fixing portions of the first fixing portions 211 are provided on each of one side and the other side of a rectangular portion of the first surface 221 in the left-right direction, while one of the fixing portions of the second fixing portions 212 are provided on each of one side and the other side of a rectangular portion of the second surface 222 in the left-right direction. Also, the cushioning members 800 are provided at trapezoidal portions of the first surface 221 and the second surface 222. The cushioning members 800 may be configured to be sandwiched between the rear frame 20 and the rear cover 30. The bottom edges of the trapezoidal portions of the first surface 221 and the second surface 222 can be formed by outwardly convex curves. The illustration of the first speaker unit 201 is omitted.

According to the speaker units 200 shown in FIGS. 26 to 29, the speaker main body 230 includes an outer shape with a concave portion. With this configuration, it is possible to secure space for arranging other components, such as circuit boards and hard disk drives and space for wiring paths while securing the capacity of the speaker main body 230 to maintain sound quality. In addition, since the number of fixing points to the rear frame 20 can be reduced, the number of the connection members can be reduced and workability can be improved. In the case of a speaker unit in which the first surface 221 and the second surface 222 have an irregular shapes, the first fixing portions 211 and the second fixing portion 212 can comprise five or more fixing portions. With this configuration, the speaker unit 200 can be stably attached and fixed to the rear frame 20. The number and position of the fixing portions in the first fixing portions 211 and the second fixing portions 212 are not particularly limited.

Figure 30:
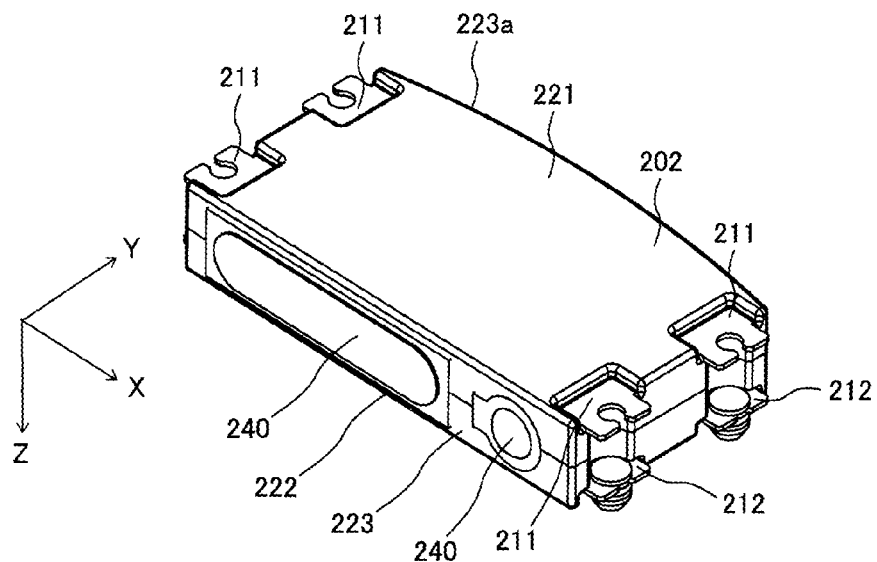
FIG. 30 is a perspective view of an example 5 of a second speaker unit according to a modification example.
Figure 31:
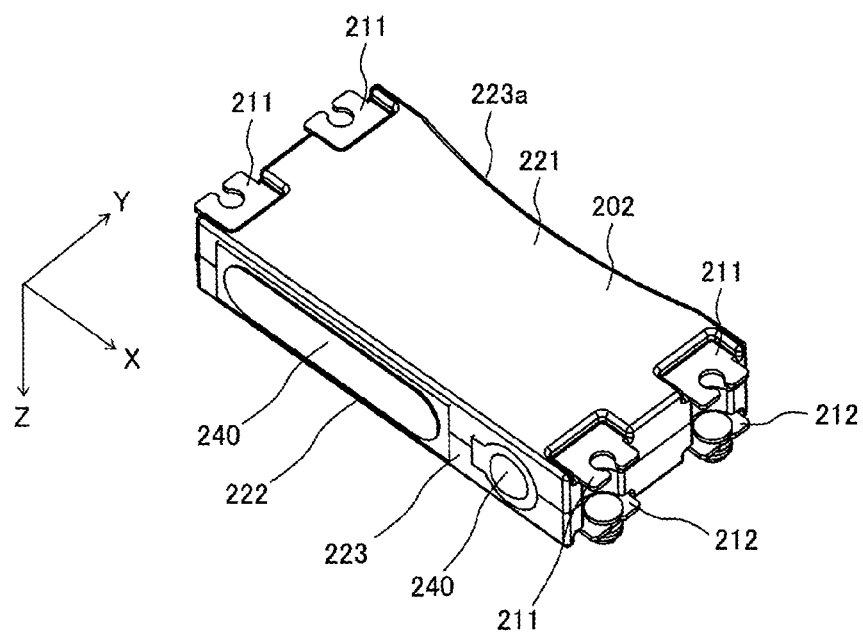
FIG. 31 is a perspective view of an example 6 of a second speaker unit according to a modification example.

In the first embodiment above, an example is illustrated in which the speaker main body 230 is configured such that the side surface 223 where the sound emitting portion 240 is disposed and a side surface 223 that is not connected to the side surface 223 are parallel to each other, but the present invention is not limited to this. For example, the side surface 223a that is not connected to the side surface 223 where the sound emitting portion 240 is disposed can have a curved shape that is convex to the outside of the speaker main body 230 or a curved shape that is concave to the outside of the speaker main body 230. As shown in FIG. 30, the second speaker unit 202 has the side surface 223a that has a curved shape that is convex to the outside of the speaker main body 230. Also, as shown in FIG. 31, the second speaker unit 202 has the side surface 223a that has a curved shape that is concave to the outside of the speaker main body 230. The illustration of the first speaker unit 201 is omitted.

Figure 32:
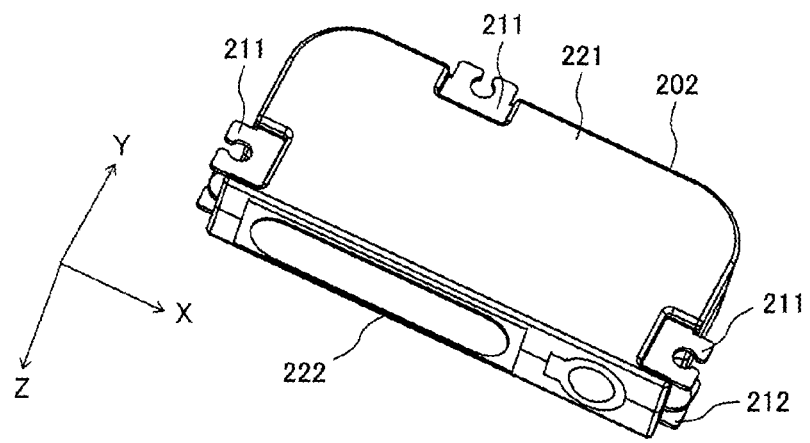
FIG. 32 is a perspective view of an example 7 of a second speaker unit according to a modification example.

In the first embodiment above, an example is illustrated in which two of the fixing portions of the first fixing portions 211 are provided along each of mutually parallel sides of the first surface 221 and two of the fixing portions of the second fixing portions 212 are provided along each of mutually parallel sides of the second surface 222, but the present invention is not limited to this. For example, as in the second speaker unit 202 shown in FIG. 32, one of the fixing portions of the first fixing portions 211 is provided along each of mutually parallel sides of the first surface 221 and one of the fixing portions of the first fixing portions 221 is provided along a side that connects the mutually parallel sides, while one of the fixing portions of the second fixing portions 212 is provided along each of mutually parallel sides of the second surface 222 and one of the fixing portions of the second fixing portions 221 is provided along a side that connects the mutually parallel sides. In this case, the number and position of the fixing portions in the first fixing portions and the second fixing portions are not particularly limited as long as relative positions of the fixing portions of the first fixing portions are arranged to be the same as relative positions of the fixing portions of the second fixing portions when the speaker main body is inverted from the state in which the first surface is fixed to the rear frame to the state in which the second surface is fixed to the rear frame. The illustration of the first speaker unit 201 is omitted.

Figure 33:
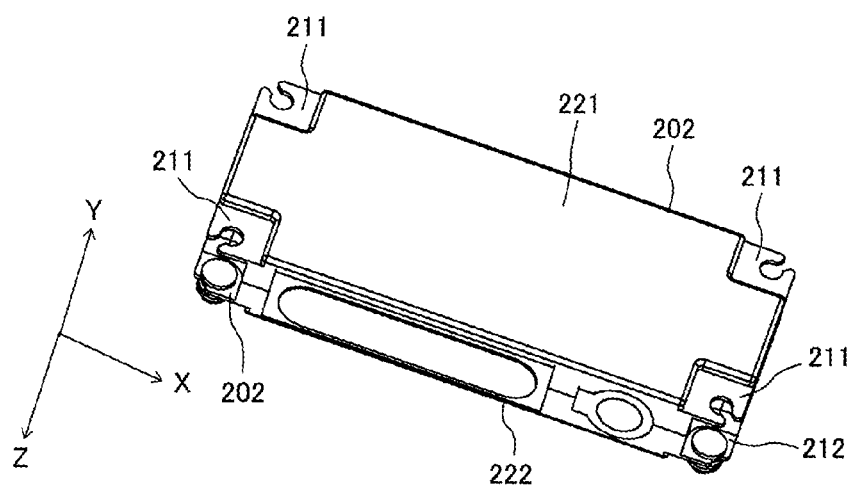
FIG. 33 is a perspective view of an example 8 of a second speaker unit according to a modification example.

Also, as in the second speaker unit 202 shown in FIG. 33, the fixing portions of the first fixing portions 211 can be provided at the four corners of the first surface 221, and the fixing portions of the second fixing portions 212 can be provided at the four corners of the second surface 222. Also, the fixing portions of the first fixing portions 211 can be provided at the mutually parallel sides and at a corner of the first surface 221, and the fixing portions of the second fixing portions 212 can be provided at the mutually parallel sides and at a corner of the second surface 222.

In the first embodiment above, an example is illustrated in which the first fixing portion 211 and the second fixing portion 212 comprise the plurality of fixing portions, but the present invention is not limited to this. The first fixing portion 211 and the second fixing portion 212 can comprise a single fixing portion. In this case, the position of the first fixing portion 211 and the position of the second fixing portion 212 are arranged to be the same when the speaker main body 230 is inverted from the state in which the first surface 221 is fixed to the rear frame 20 to the state in which the second surface 222 is fixed to the rear frame 20. With this configuration, the same speaker units 200 can be symmetrically disposed on the rear side of the display 10 as the first speaker unit 201 with the first surface 221 fixed to the rear frame 20 and the second speaker unit 202 with the second surface 222 fixed to the rear frame 20.

In the first embodiment above, an example is illustrated in which the first fixing portions 211 are provided in the portions 224 of the first surface 221 that are depressed toward the second surface 222 and the second fixing portions 212 are provided in the portions 225 of the second surface 222 that are depressed toward the first surface 221, but the present invention is not limited to this. The first fixing portions 211 can be provided protruding from the side surface 223 along the first surface 221, and the second fixing portions 212 can be provided protruding from the side surface 223 along the second surface 221. Also, the first fixing portions 211 can include one provided in the portion 224 of the first surface 221 that is depressed toward the second surface 222 and one provided protruding from the side surface 223 along the first surface 221, and the second fixing portions 212 can include one provided in the portion 225 of the second surface 222 that is depressed toward the first surface 221 and one provided protruding from the side surface 223 along the second surface 222. Even in this case, the same effect as that of the first embodiment can be obtained.

Figure 34:
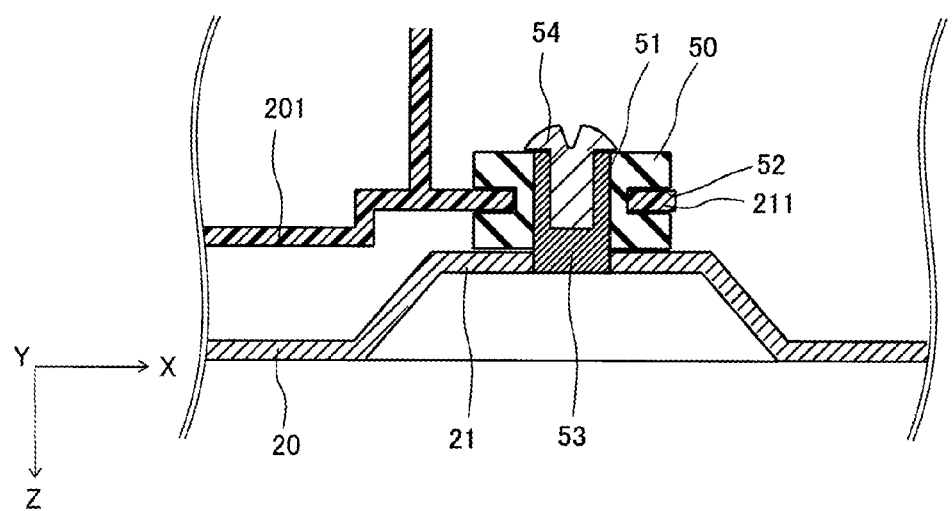
FIG. 34 is a schematic cross-sectional view of an example 2 of a fixing structure between a first speaker unit and a rear frame.

In the first embodiment above, an example is illustrated in which the first and second speaker units 201 and 202 are configured such that the first fixing portions 211 or the second fixing portions 212 are fixed to the rear frame side fixing portions 21 via the connection members 40 including the lower part 41 having a dome shape and the upper part 42 having a column shape, but the present invention is not limited to this. As shown in FIG. 34, for example, the fixing structures of the first and second speaker units 201 and 202 and the rear frame 20 can be a structure in which the first notches 213 formed on the first fixing portions 211 of the first speaker unit 211 and the second notches 214 formed on the second fixing portions 212 of the second speaker unit 202 are fitted with the cylindrical members 50 according to the fourth embodiment including the through hole 51 and the annular recess 52, studs 53 with screw holes are fitted into the through holes 51 of the cylindrical members 50 and the holes 23 formed in the rear frame side fixing portions 21, and screws 54 are fitted into the screw holes of the studs 53. With this configuration, the cylindrical members 50 used for connecting to the rear cover according to the fourth embodiment can be used as a component of the fixing structure of the first and second speaker units 201 and 202 and the rear frame 20. FIG. 34 is a schematic cross-sectional view of an example 2 of the fixing structure of the first speaker unit 201 and the rear frame 20. An example 2 of the fixing structure of the second speaker unit 202 and the rear frame 20 is the same as the example 2 of the fixing structure of the first speaker unit 201 and the rear frame 20, so the illustration is omitted.

In the first embodiment above, an example is illustrated in which the first and second speaker units 201 and 202 contain two speakers in the speaker main body 230, but the present invention is not limited to this. The number of speakers contained in the speaker main body 230 can be one or three or more. When the number of speakers is one, one sound emitting portion 240 is provided in the side surface 223 of the speaker main body 230 and is displaced from the center of the side surface 223 in the side surface 223 of the speaker main body 230. The sound emitting portion 240 is arranged to be symmetrical with respect to the axis of inversion when the speaker main body 230 is inverted from the state in which the first surface 221 of the speaker unit 200 is fixed to the rear frame 20 to the state in which the second surface 222 of the speaker unit 200 is fixed to the rear frame 20.

When the number of speakers is three or more, three or more sound emitting portions 240 are provided in the side surface 223 of the speaker main body 230 and are disposed asymmetrically with respect to the center of the side surface 223 on the side surface 223 of the speaker main body 230. The three or more sound emitting portions 240 are arranged to be symmetrical with respect to the axis of inversion when the speaker main body 230 is inverted from the state in which the first surface 221 of the speaker unit 200 is fixed to the rear frame 20 to the state in which the second surface 222 of the speaker unit 200 is fixed to the rear frame 20. As long as the sound emitting portions 240 of the same type of speaker are arranged to be symmetrical with respect to the axis of inversion, the sound emitting portions 240 of the same speaker do not need to be arranged to be symmetrical with respect to the axis of inversion when the speaker main body is inverted.

In view of the state of the known technology and according to a first aspect of the present invention, a display device comprises a display, a rear side member provided on a rear side of the display, and a plurality of speaker units attached to the rear side member and including a first speaker unit disposed on one side in a left-right direction on the rear side of the display and a second speaker unit disposed on the other side, the speaker units each having a speaker main body having first and second surfaces that are attachable to the rear side member and are parallel to each other and a side surface that connects the first surface and the second surface, a first fixing portion for attaching and fixing the first surface to the rear side member, a second fixing portion for attaching and fixing the second surface to the rear side member, and at least one sound emitting portion displaced from a center of the side surface on the side surface, when the speaker main body is inverted from a first state in which the first surface is fixed to the rear side member to a second state in which the second surface is fixed to the rear side member, the at least one sound emitting portion in the first state and the at least one sound emitting portion in the second state being arranged to be symmetrical with respect to an axis of inversion.

In the display device according to the first aspect of the present invention, as described above, the speaker unit includes the first fixing portion, the second fixing portion, and the at least one sound emitting portion disposed on the side surface, and the at least one sound emitting portion in the first state and the at least one sound emitting portion in the second state are arranged to be symmetrical with respect to the axis of inversion when the speaker main body is inverted from the first state in which the first surface is fixed to the rear side member to the first state in which the second surface is fixed to the rear side member. With this configuration, for the same speaker unit, the speaker unit disposed on the left side of the rear side of the display with the first surface fixed to the rear side member can be used as the first speaker unit (e.g., the speaker unit for the right side), and the speaker unit disposed on the right side of the rear side of the display with the second surface fixed to the rear side member can be used as the second speaker unit (e.g., the speaker unit for the left side). Therefore, for a speaker unit with a configuration in which the at least sound emitting portion of the speaker is arranged on a surface other than an attaching surface to the rear side member, parts can be shared between the left side speaker unit and the right side speaker unit. As a result, the number of parts can be reduced. In some cases, the at least one sound emitting portion can include two or more sound emitting portions that are disposed asymmetrically with respect to the center of the side surface on the side surface.

In accordance with a preferred embodiment according to the display device above, a position of the first fixing portion in the first state is arranged to be the same as a position of the second fixing portion in the second state when the speaker main body is inverted from the first state in which the first surface is fixed to the rear side member to the second state in which the second surface is fixed to the rear side member. With this configuration, the same speaker unit can be symmetrically disposed on the rear side of the display as the first speaker unit (e.g., the speaker unit for the right side) with the first surface fixed to the rear side member and the second speaker unit (e.g., the speaker unit for the left side) with the second surface fixed to the rear side member.

In accordance with a preferred embodiment according to any one of the display devices mentioned above, the first fixing portion and the second fixing portion comprise a plurality of fixing portions, and relative positions of the fixing portions of the first fixing portion in the first state are arranged to be the same as relative positions of the fixing portions of the second fixing portion in the second state when the speaker main body is inverted from the first state in which the first surface is fixed to the rear side member to the second state in which the second surface is fixed to the rear side member. With this configuration, the first fixing portion and the second fixing portion can be easily and securely attached and fixed to fixing portions formed on the rear side member for attaching the first fixing portion and the second fixing portion.

In accordance with a preferred embodiment according to any one of the display devices mentioned above, positions of the fixing portions of the first fixing portion and positions of the fixing portions of the second fixing portion are aligned when viewed from the first surface side of the speaker main body. With this configuration, the same speaker unit can be symmetrically disposed on the rear side of the display as the first speaker unit (e.g., the speaker unit for the right side) with the first surface fixed to the rear side member and the second speaker unit (e.g., the speaker unit for the left side) with the second surface fixed to the rear side member.

In accordance with a preferred embodiment according to any one of the display devices mentioned above, the first surface and the second surface have a rectangular shape, two of the fixing portions of the first fixing portion are provided along each of mutually parallel sides of the first surface, and two of the fixing portions of the second fixing portion are provided along each of mutually parallel sides of the second surface. With this configuration, the first fixing portion and the second fixing portion can be more securely attached and fixed to fixing portions formed on the rear side member for attaching the first fixing portion and the second fixing portion.

In accordance with a preferred embodiment according to any one of the display devices mentioned above, the first fixing portion is provided protruding from the speaker main body along the first surface, and the second fixing portion is provided protruding from the speaker main body along the second surface. With this configuration, the first fixing portion and the second fixing portion can be seen when the speaker unit is attached and fixed to the rear side member. Therefore, the first fixing portion and the second fixing portion can be more easily attached and fixed to fixing portions formed on the rear side member for attaching the first fixing portion and the second fixing portion.

In accordance with a preferred embodiment according to any one of the display devices mentioned above, the rear side member includes a third fixing portion for fixing the first fixing portion and the second fixing portion and provided on the one side and the other side in the left-right direction protruding away from the display, the first fixing portion is provided in a portion of the first surface that is depressed toward the second surface or is provided protruding from the side surface along the first surface, the second fixing portion is provided in a portion of the second surface that is depressed toward the first surface or is provided protruding from the side surface along the second surface, the first speaker unit is fixed via a first gap between the first surface and the rear side member while the first fixing portion is fixed to the third fixing portion via a connection member, and the second speaker unit is fixed via a second gap between the second surface and the rear side member while the second fixing portion is fixed to the third fixing portion via the connection member. With this configuration, by fixing the speaker unit to the rear side member via the first gap and the second gap, it is possible to suppress the transmission of vibration of the speaker unit to the rear side member. In addition, by providing the first fixing portion and the second fixing portion protruding from the depressed portions or the side surfaces, the distance from the rear side member to the first surface or the second surface of the speaker unit that is not fixed to the rear side member can be reduced. As a result, the transmission of vibration by the speaker unit can be suppressed and the increase of the thickness of the rear side of the display device can be suppressed.

In accordance with a preferred embodiment according to any one of the display devices mentioned above, the display device further comprises a third speaker unit disposed between the first speaker unit that is fixed to the rear side member with the first fixing portion and the second speaker unit that is fixed to the rear side member with the second fixing portion, and fixed by the second fixing portion of the first speaker unit and the first fixing portion of the second speaker unit. With this configuration, it is not necessary to form a fixing portion for attaching and fixing the third speaker unit to the rear side member by effectively utilizing the first fixing portion or the second fixing portion that is not fixed to the rear side member. Therefore, it is possible to attach and fix the third speaker unit simply.

In accordance with a preferred embodiment according to any one of the display devices mentioned above, the display device further comprises a fourth speaker unit disposed on the second surface of the first speaker unit that is fixed to the rear side member with the first fixing portion and on the first surface of the second speaker unit that is fixed to the rear side member with the second fixing portion, fixed by the second fixing portion of the first speaker unit, and fixed by the first fixing portion of the second speaker unit. With this configuration, it is not necessary to form a fixing portion for attaching and fixing the fourth speaker unit to the rear side member by effectively utilizing the first fixing portion or the second fixing portion that is not fixed to the rear side member. Therefore, it is possible to attach and fix the fourth speaker unit simply.

In accordance with a preferred embodiment according to any one of the display devices mentioned above, the display device further comprises a rear cover provided on the opposite side of the speaker units relative to the rear side member and connected to the second fixing portion of the first speaker unit that is fixed to the rear side member with the first fixing portion and to the first fixing portion of the second speaker unit that is fixed to the rear side member with the second fixing portion. Here, the rear cover covering the speaker unit disposed on the rear side member vibrates due to the transmission of the sound output from the speaker unit. Due to this vibration of the rear cover, the rear cover may interfere with protective members for protecting terminals and other components, resulting in interference noise (chattering noise). In addition, the rear cover may be deformed due to temperature rise of a space between the rear cover and the rear side member caused by the increase in heat generation of the display due to high brightness and high image quality. With the configuration as described above, the number of fixing points of the rear cover in the display device can be increased by effectively utilizing the first fixing portion or the second fixing portion that is not fixed to the rear side member. Therefore, by suppressing the vibration of the rear cover, the generation of interference noise (chattering noise) caused by the vibration of the rear cover can be suppressed, and the deformation of the rear cover caused by temperature rise can be suppressed.

In accordance with a preferred embodiment according to any one of the display devices mentioned above, the display device further comprises a component holding member for holding a component and fixed to at least one of the second fixing portion of the first speaker unit that is fixed to the rear side member with the first fixing portion and the first fixing portion of the second speaker unit that is fixed to the rear side member with the second fixing portion. With this configuration, by effectively utilizing the first fixing portion or the second fixing portion that is not fixed to the rear side member, it is not necessary to form a fixing portion for attaching and fixing a component to the rear side member. Therefore, it is possible to attach and fix a component simply.

In accordance with a preferred embodiment according to any one of the display devices mentioned above, the rear side member includes a rear frame, and the first fixing portion is directly attached and fixed to the rear frame in the first speaker unit, and the second fixing portion is directly attached and fixed to the rear frame in the second speaker unit. With this configuration, the speaker unit can be easily and simply attached and fixed to the rear frame.

In accordance with a preferred embodiment according to any one of the display devices mentioned above, the rear side member includes a rear frame and a speaker unit attaching member provided to the rear frame and for attaching the speaker unit, the first fixing portion is attached and fixed to the rear frame via the speaker unit attaching member in the first speaker unit, and the second fixing portion is attached and fixed to the rear frame via the speaker unit attaching member in the second speaker unit. With this configuration, the first speaker unit and the second speaker unit can be simply attached and fixed to the rear frame via the speaker unit attaching member even when the rear frame cannot be provided with a fixing portion for fixing the first fixing portion of the first speaker unit and the second fixing portion of the second speaker unit duet to the positioning of the first speaker unit and the second speaker unit, the rear frame is not provided with a fixing portion for fixing the first fixing portion of the first speaker unit and the second fixing portion of the second speaker unit, or different speaker units of different sizes or shapes are desired to be used.

In view of the state of the known technology and according to a second aspect of the present invention, a speaker unit comprises a speaker main body having first and second surfaces that are attachable to a device and are parallelly opposite to each other and a side surface that connects the first surface and the second surface, a first fixing portion for attaching and fixing the first surface to the device, a second fixing portion for attaching and fixing the second surface to the device, and at least one sound emitting portion displaced from a center of the side surface on the side surface, when the speaker main body is inverted from a first state in which the first surface is fixed to the device to a second state in which the second surface is fixed to the device, the at least one sound emitting portion in the first state and the at least one sound emitting portion being arranged to be symmetrical with respect to an axis of inversion.

The speaker unit according to the second aspect of the present invention includes, as in the first aspect above, the first fixing portion, the second fixing portion, and the at least one sound emitting portion disposed on the side surface, and the at least one sound emitting portion in the first state and the at least one sound emitting portion are arranged to be symmetrical with respect to the axis of inversion when the speaker main body is inverted from the first state in which the first surface is fixed to the device to the second state in which the second surface is fixed to the device. With this configuration, for the same speaker unit, the speaker unit with the first surface fixed to the device can be used as a speaker unit for the right side, for example, and the speaker unit with the second surface fixed to the device can be used as a speaker unit for the left side, for example. Therefore, for a speaker unit with a configuration in which the at least one sound emitting portion of the speaker is arranged on a surface other than an attaching surface to the device, parts can be shared between the left side speaker unit and the right side speaker unit. As a result, the number of parts can be reduced. In some cases, the at least one sound emitting portion can include two or more sound emitting portions that are disposed asymmetrically with respect to the center of the side surface on the side surface.

With the present invention, as described above, it is possible to provide a display device and a speaker unit in which parts can be shared between the left side speaker unit and the right side speaker unit for a speaker unit having a configuration in which the sound emitting portion of the speaker is arranged on a surface other than the attaching surface to the rear side member.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe a speaker unit should be interpreted relative to a display device in an upright position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a display;
a rear side member provided on a rear side of the display; and
a plurality of speaker units attached to the rear side member and including a first speaker unit disposed on one side in a left-right direction on the rear side of the display and a second speaker unit disposed on the other side,
the speaker units each having
a speaker main body having first and second surfaces that are attachable to the rear side member and are parallel to each other and a side surface that connects the first surface and the second surface,
a first fixing portion for attaching and fixing the first surface to the rear side member,
a second fixing portion for attaching and fixing the second surface to the rear side member, and
at least one sound emitting portion displaced from a center of the side surface on the side surface, the at least one sound emitting portion including two or more sound emitting portions that are disposed asymmetrically with respect to the center of the side surface on the side surface,
when the speaker main body is inverted from a first state in which the first surface is fixed to the rear side member to a second state in which the second surface is fixed to the rear side member, the at least one sound emitting portion in the first state and the at least one sound emitting portion in the second state being arranged to be symmetrical with respect to an axis of inversion.

2. The display device according to claim 1, wherein
a position of the first fixing portion in the first state is arranged to be the same as a position of the second fixing portion in the second state when the speaker main body is inverted from the first state in which the first surface is fixed to the rear side member to the second state in which the second surface is fixed to the rear side member.

3. The display device according to claim 1, wherein
the first fixing portion and the second fixing portion comprise a plurality of fixing portions, and
relative positions of the fixing portions of the first fixing portion in the first state are arranged to be the same as relative positions of the fixing portions of the second fixing portion in the second state when the speaker main body is inverted from the first state in which the first surface is fixed to the rear side member to the second state in which the second surface is fixed to the rear side member.

4. The display device according to claim 3, wherein positions of the fixing portions of the first fixing portion and positions of the fixing portions of the second fixing portion are aligned when viewed from the first surface side of the speaker main body.

5. The display device according to claim 3, wherein
the first surface and the second surface have a rectangular shape,
two of the fixing portions of the first fixing portion are provided along each of mutually parallel sides of the first surface, and
two of the fixing portions of the second fixing portion are provided along each of mutually parallel sides of the second surface.

6. The display device according to claim 3, wherein
the fixing portions of the first fixing portion are arranged to be symmetrical with respect to a plane extending perpendicular to the first surface and the second surface of the speaker main body, and
the fixing portions of the second fixing portion are arranged to be symmetrical with respect to a plane extending perpendicular to the first surface and the second surface of the speaker main body.

7. The display device according to claim 1, wherein
the first fixing portion is provided protruding from the speaker main body along the first surface, and the second fixing portion is provided protruding from the speaker main body along the second surface.

8. The display device according to claim 1, wherein
the rear side member includes a third fixing portion for fixing the first fixing portion and the second fixing portion and provided on the one side and the other side in the left-right direction protruding away from the display,
the first fixing portion is provided in a portion of the first surface that is depressed toward the second surface or is provided protruding from the side surface along the first surface,
the second fixing portion is provided in a portion of the second surface that is depressed toward the first surface or is provided protruding from the side surface along the second surface,
the first speaker unit is fixed via a first gap between the first surface and the rear side member while the first fixing portion is fixed to the third fixing portion via a connection member, and
the second speaker unit is fixed via a second gap between the second surface and the rear side member while the second fixing portion is fixed to the third fixing portion via the connection member.

9. The display device according to claim 1, further comprising
a third speaker unit disposed between the first speaker unit that is fixed to the rear side member with the first fixing portion and the second speaker unit that is fixed to the rear side member with the second fixing portion, and fixed by the second fixing portion of the first speaker unit and the first fixing portion of the second speaker unit.

10. The display device according to claim 1, further comprising
a third speaker unit disposed on the second surface of the first speaker unit that is fixed to the rear side member with the first fixing portion and on the first surface of the second speaker unit that is fixed to the rear side member with the second fixing portion, fixed by the second fixing portion of the first speaker unit, and fixed by the first fixing portion of the second speaker unit.

11. The display device according to claim 1, further comprising
a rear cover provided on the opposite side of the speaker units relative to the rear side member and connected to the second fixing portion of the first speaker unit that is fixed to the rear side member with the first fixing portion and to the first fixing portion of the second speaker unit that is fixed to the rear side member with the second fixing portion.

12. The display device according to claim 1, further comprising
a component holding member for holding a component and fixed to at least one of the second fixing portion of the first speaker unit that is fixed to the rear side member with the first fixing portion and the first fixing portion of the second speaker unit that is fixed to the rear side member with the second fixing portion.

13. The display device according to claim 1, wherein
the rear side member includes a rear frame, and
the first fixing portion is directly attached and fixed to the rear frame in the first speaker unit, and the second fixing portion is directly attached and fixed to the rear frame in the second speaker unit.

14. The display device according to claim 1, wherein
the rear side member includes a rear frame and a speaker unit attaching member provided to the rear frame and for attaching the speaker units,
the first fixing portion is attached and fixed to the rear frame via the speaker unit attaching member in the first speaker unit, and
the second fixing portion is attached and fixed to the rear frame via the speaker unit attaching member in the second speaker unit.

15. The display device according to claim 1, wherein
the first speaker unit and the second speaker unit are identical to each other.

16. The display device according to claim 15, wherein
the first fixing portion of the first speaker unit is fixed to the rear side member such that the first surface of the first speaker unit faces toward the rear side member, and
the second fixing portion of the second speaker unit is fixed to the rear side member such that the second surface of the second speaker unit faces toward the rear side member.

17. The display device according to claim 16, wherein
the first speaker unit and the second speaker unit are arranged to be symmetrical with respect to a center line of the display device.

18. The display device according to claim 1, wherein
the speaker main body is symmetrical with respect to a center plane that is parallel to the first surface and the second surface.

19. A speaker unit comprising:
a speaker main body having first and second surfaces that are attachable to a device and are parallelly opposite to each other and a side surface that connects the first surface and the second surface;
a first fixing portion for attaching and fixing the first surface to the device;
a second fixing portion for attaching and fixing the second surface to the device; and at least one sound emitting portion displaced from a center of the side surface on the side surface, the at least one sound emitting portion including two or more sound emitting portions that are disposed asymmetrically with respect to the center of the side surface on the side surface, when the speaker main body is inverted from a first state in which the first surface is fixed to the device to a second state in which the second surface is fixed to the device, the at least one sound emitting portion in the first state and the at least one sound emitting portion in the second state being arranged to be symmetrical with respect to an axis of inversion.

* * * * *